United States Patent [19]
Tso et al.

[11] Patent Number: 6,157,323
[45] Date of Patent: Dec. 5, 2000

[54] BUTTON-KEY/CYLINDRICAL-KEY ALPHABETIZER

[76] Inventors: Kevin H. K. Tso, 6253 Robin Ridge Ct., San Jose, Calif. 95135; Kenneth K. Li, 217 Laurel Ave., Arcadia, Calif. 91006; Daniel S. Kwoh, 3975 Hampstead Rd., La Cañada/Flintridge, Calif. 91011

[21] Appl. No.: 09/257,785

[22] Filed: Feb. 25, 1999

Related U.S. Application Data

[60] Provisional application No. 60/075,951, Feb. 25, 1998.

[51] Int. Cl.⁷ ................................................. H03M 11/00
[52] U.S. Cl. ........................ 341/22; 341/20; 341/176; 345/168; 400/489; 200/5 A; 379/354
[58] Field of Search ................................ 341/20, 22, 176; 345/168, 169, 157; 200/5 A, 6 A; 708/145; 400/489; 379/354

[56] References Cited

U.S. PATENT DOCUMENTS

| | | | |
|---|---|---|---|
| 4,029,915 | 6/1977 | Ojima | 200/5 A |
| 4,202,038 | 5/1980 | Petersson | 708/145 |
| 4,408,103 | 10/1983 | Smith, III | 200/6 A |
| 4,687,200 | 8/1987 | Shirai | 708/145 |
| 4,769,516 | 9/1988 | Allen | 200/5 A |
| 4,896,003 | 1/1990 | Hsieh | 200/6 A |
| 5,007,008 | 4/1991 | Beers | 341/22 |
| 5,504,286 | 4/1996 | Tsai | 200/6 A |
| 5,528,235 | 6/1996 | Lin et al. | 341/22 |
| 5,677,949 | 10/1997 | Macor | 379/354 |
| 5,786,776 | 7/1998 | Kisaichi | 341/23 |
| 5,847,697 | 12/1998 | Sugimoto | 345/168 |

FOREIGN PATENT DOCUMENTS

| | | |
|---|---|---|
| 2 016 184 | 9/1979 | United Kingdom. |
| WO 97/04472 | 2/1997 | WIPO. |

OTHER PUBLICATIONS

Copy of International Search Report from corresponding PCT application PCT/US99/04162; 9 pgs.

*Primary Examiner*—Michael Horabik
*Assistant Examiner*—Albert K. Wong
*Attorney, Agent, or Firm*—Christie, Parker & Hale, LLP

[57] ABSTRACT

A multiple input key for inputting characters and the key has a body with a top and bottom surface, with the bottom surface being proximal to a printed circuit board and the top surface being distal from the printed circuit board. The key is pivotable about a pivot. A pivot extends from the bottom surface of the body and has an electrical contact pad such that when the contact pad contacts one of the leads on the printed circuit board a circuit is closed. A skirt surrounds the periphery of the body of the key and the skirt operatively supports the body of the key on the printed circuit board.

18 Claims, 13 Drawing Sheets

BUTTON-KEY/CYLINDRICAL-KEY ALPHABETIZER

CROSS REFERENCE TO RELATED APPLICATIONS

This application claims the benefit of U.S. Provisional application Ser. No. 60/075,951, filed Feb. 25, 1998 which is hereby incorporated by reference as if set forth in full herein.

BACKGROUND OF THE INVENTION

The present invention relates generally to text input devices for microprocessor-based electronic equipment, and more particularly to a multiple character text input device having a limited number of input keys.

Many types of electronic equipment such as hand held computers, TVs, VCRs, cable TV and satellite TV set-top boxes, PCs, cordless telephones, and cellular telephones are configured to accept and even require information such as alphanumeric text, numbers, and assorted symbols to be provided by a user. For instance, many types of electronic equipment are configured with electronic mail. Electronic mail which is quickly becoming ubiquitous in both the business and home environments requires the input of at least 26 characters of the alphabet, numbers, and assorted symbols when using the English language.

Text information, letters, numbers, and symbols, is usually provided to the many types of electronic equipment by text input devices built in the electronic equipment such as keyboards built in a hand held computer or keypads on a cellular telephone. Another conventional way of providing text information to the many types of electronic equipment is through separate hand held text input devices such as a remote control or an infrared keyboard for a VCR, TV, cable TV set-top box, satellite TV set-top box, or PC. With input devices built in the many types of electronic equipment and hand held text input devices being continuously reduced for convenience and portability, the area on the input devices for inputting text information is also being Internet services, electronic TV program guides, and other types of applications requiring the input of alphanumeric text and with input devices having a limited area for providing the alphanumeric text input, reconciliation of these competing forces has become a difficult problem.

Conventionally, the primary interface for providing information to the many types of electronic equipment is a keyboard. For instance, in the home environment TV-based computers such as WebTV are configured with Internet services such as electronic mail and browsers which require alphanumeric text input and an infrared keyboard which provides the text input to the TV-based computer. However, like most conventional keyboards, the infrared keyboard is bulky and cumbersome and presents yet another remote control to a user who already has too many remote controls in their living room. Additionally, these keyboards are not ideal for use with electronic devices that are quite compact, such as cellular phones. Although keyboards can be reduced in size as in the case of hand held computers, eventually a point is reached where the keyboard cannot be reduced without making the keyboard difficult and inefficient to use. Accordingly, the next input interface of choice for many types of electronic equipment is a keypad.

Conventionally, keypads have a limited number of keys, usually 12, and require a sequential input scheme for providing alphanumeric text to the electronic equipment. For example, to enter the letter "C", a user presses a number 2 key on the keypad three times to select the letter "C" out of the letters A, B and C associated with the number 2 key of the keypad. Hashimoto (U.S. Pat. No. 4,918,721) discloses such an input scheme. However, the input scheme is complicated and requires some memorization by a user. Therefore, using such an input device is operationally confusing to a user and difficult to learn.

Other devices such as one disclosed by Lin et al. (U.S. Pat. No. 5,528,235) have a multi-function data processing key having a key top divided into multiple surfaces indicating different letters of the alphabet. Also, Ojima (U.S. Pat. No. 4,029,915) describes a calculator keyboard having a row of keys each adapted to be tilted in one of four directions, and Hsieh (U.S. Pat. No. 4,896,003) describes a multi-directional switch using a ball bearing and deformable supports. Each of these devices is mechanically complicated and thereby costly to manufacture. Additionally, these devices are confusing to operate. Accordingly, methods and devices for providing alphanumeric text input that are simpler in construction and in operation are desirable.

Furthermore, with TV and cable TV channels becoming more numerous, exceeding more than 100 channels on some cable networks, program selection is becoming more confusing. New types of electronic equipment attempt to address this problem by providing on-screen program information. While viewing the on-screen information, a user selects a TV program from a category, such categories are grouped by program type like sports. However, partly due to the lack of a suitable text input device, categorizing and searching for specific subjects or text strings included in the program information is difficult. With a suitable text input device, a user can search for an actress or actor's name, a movie title, or a keyword in the description of a program. Accordingly, methods and devices providing text input for electronic equipment which traditionally did not require text input are also desirable.

SUMMARY OF THE INVENTION

The present invention provides methods and devices for inputting alphanumeric text and assorted symbols using a set of multiple input keys. According to the present invention, a device is provided for inputting characters. The device has a printed circuit board with a plurality of electrical leads. The device also has a plurality of keys and each key is pivotable about a pivot axis. Each key has a body with a top and a bottom surface with the bottom surface being proximal to the printed circuit board and the top surface being distal to the printed circuit board. A skirt surrounds the periphery of the body of the key and the skirt operatively supports the body of the key on the printed circuit board. A pivot extends from the bottom surface of the body and has an electrical contact pad such that when the contact pad contacts one of the leads on the printed circuit board a circuit is closed. The pivot varies in shape such as being a rectangle, triangle, trapezoid, a single curve, cylindrical, or y-shaped. The pivot and the skirt is made of a resilient material or rubber. The top surface of the body varies in shape such as being flat, concave, convex, flat with a protrusion or divided into sections related to the contacts. The body of the key varies in shape such as being round, triangular or oval.

In one embodiment, a multiple input key is provided for inputting characters. The key has a body with a top and a bottom surface with the bottom surface being proximal to the printed circuit board and the top surface being distal to the printed circuit board. A skirt surrounds the periphery of the body of the key and the skirt operatively supports the body of the key on the printed circuit board. A pivot extends from the bottom surface of the body and is movably connected with the printed circuit board. A plurality of electrical contact pads are on the bottom surface of the body of the key such that when the one of the contact pads contacts one of the leads on the printed circuit board a circuit is closed. The pivot and the skirt is made of a resilient material or rubber.

In another embodiment, a key is depressed and thus a choice of characters is displayed on a display. The key is manipulated to highlight a desired character on the display or the key is depressed for a period of time to display a specific character. The key is released to input the desired character or the key is released for a predetermined period of time to input the desired character.

In another embodiment, a key is depressed and a character is displayed on a display. The key is manipulated to display another character on the display and the key is released to input a character.

Many of the attendant features of this invention will be more readily appreciated as the same becomes better understood by reference to the following detailed description considered in connection with the accompanying drawings.

DETAILED DESCRIPTION OF THE INVENTION

Figure 1:
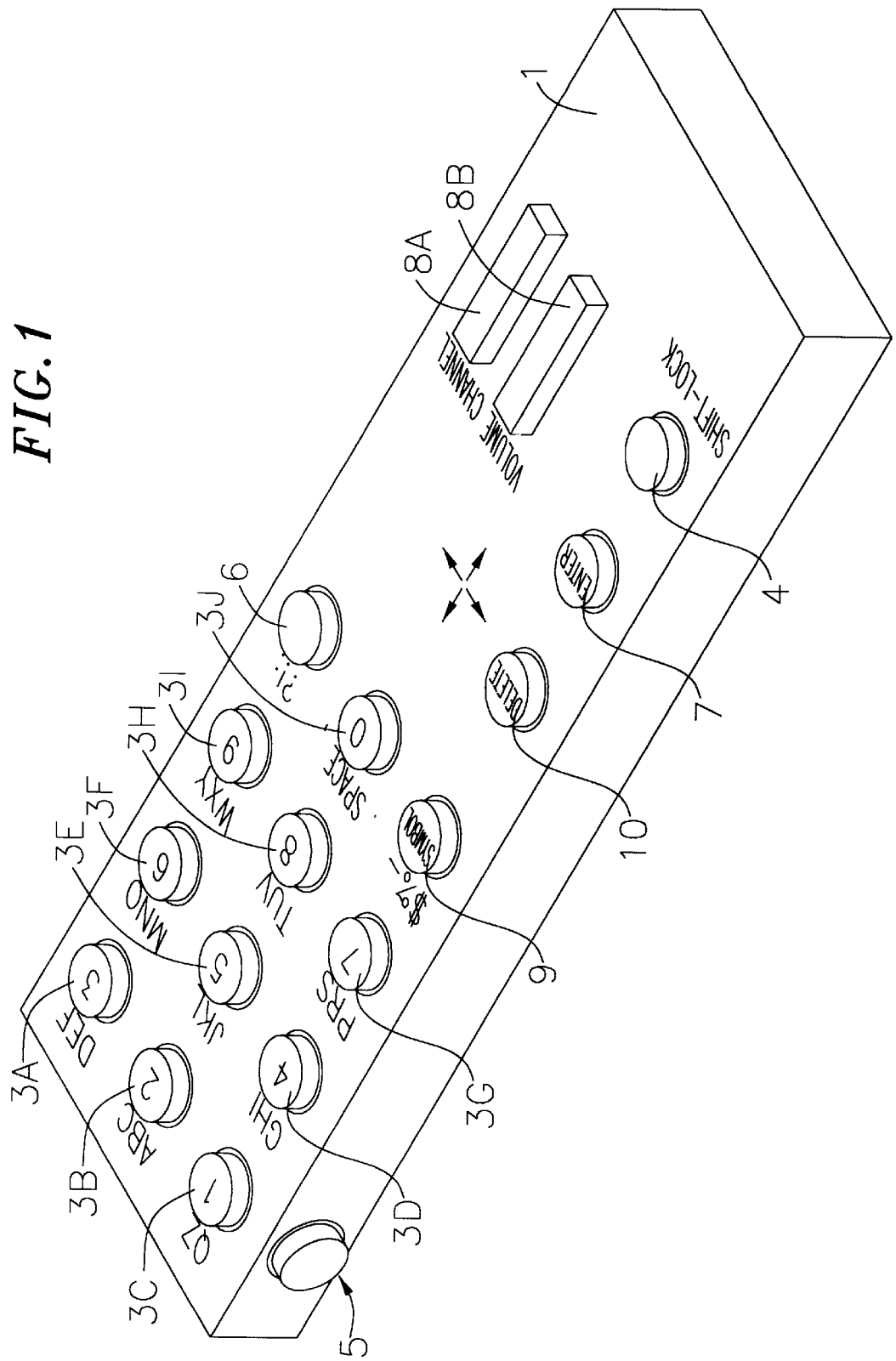
FIG. 1 illustrates a prospective view of an embodiment of the device for inputting characters of the present invention.

The present invention provides a method and a device for inputting alphanumeric text and assorted symbols using a set of multiple input keys. FIG. 1 illustrates a prospective view of one embodiment of an input device for inputting characters. The input device has a housing 1 with a number of openings in which alphanumeric multiple input keys 3A–3J extend through the openings. Keys labeled 0–9 are assigned alphabetic text similar to a standard telephone keypad. For example, the number 2 key 3B is assigned letters A, B, and C and letters Q and Z are assigned to the number 1 key 3C. The letter assignment for each of the keys can vary. For example, letters Q and Z could have been assigned to the number 0 key 3J instead of the number 1 key 3C.

The placement and order of the labels for the letters, numbers or symbols can also vary. For instance, in addition to being directly above the key, the letters could have been placed to the right, left or bottom of the keys. However, it is preferable that the order and placement of the letters, symbols or numbers assigned to the keys coincide with the operation of the keys to which they are assigned.

Additionally, an enter key 7 is shown which is used to indicate the end of a text input and a symbol key 9 is shown which is used to bring up an on screen keyboard to allow a user to select additional symbols not included on the keypad. A delete and directional key 10 allows editing of text input if so required. A quick symbol key 6 allows for commonly used symbols to be inputted quickly by the input device. A channel key 8A and volume key 8B act as specialty keys that provide specific input information for a particular input device which is generally not required on other input devices.

A shift lock key 4 allows a user to toggle the input device between a numeric only mode and a text mode. In numeric only mode, any operation performed by the multiple input keys 3A–3J are interpreted as numbers, and in text mode, any operation performed by the multiple input keys 3A–3J is interpreted as text or symbols. If the input device is in numeric only mode, pressing the shift lock key changes the mode of the input device to text mode. If the input device is in text mode, pressing the shift lock key changes the mode of the input device to numeric only mode.

The shift key 5 operates similarly to the shift lock key. However, the operation of the shift key 5 requires that the shift key be depressed and held down while one of the multiple input keys 3A–3J is selected. For example, if the input device is in numeric only mode, and the shift key is being pressed, all operation of the multiple input keys will then be interpreted as text only.

In another embodiment, the shift key 5 operates on a single character basis. For example, if the input device is in numeric only mode and the shift key 5 is pressed and then released, the mode of the input device changes to text mode. Any operation performed by one of the multiple input keys 3A–3J is interpreted as text and then the mode of the input device changes back to numeric only mode. Therefore, pressing and then releasing the shift key 5 causes the input device to switch modes, from text to numeric only and vice versa, for only the next operation of one of the multiple input keys 3A–3J.

The shift key 5 as illustrated in FIG. 1 is conveniently positioned on the side of the input device. This allows for activation of the shift key by a thumb of a user when a user is holding the input device in the palm of her hand and therefore makes the shift key easier to operate. The shift key 5 and the shift lock key 4 ease the operation of inputting alphanumeric information if so desired by a user or required by the type of electronic equipment.

Although not shown in FIG. 1, the multiple input keys 3A–3J are coupled with a printed circuit board and the input device is coupled with a display and one or more microprocessors. Both the display and microprocessor are embedded into the input device such as in the case of a hand held computer or a cellular phone. Alternatively, the display and one or more microprocessors is in separate devices. For example, the display and one microprocessor could be in a TV and another microprocessor could be in a remote control, the input device. In another example, the display could be a TV and the TV, display, is responsive to a set-top box which has a microprocessor. In turn, the set-top box is responsive to a remote control, the input device.

In one embodiment, the processor in a TV or set-top box is configured to interpret codes or symbols produced and sent by the input device. The processor thereby causes the display, the TV, to display characters based on the codes received. Therefore, the display, responsive to the microprocessor and the input device, provides visual feedback to the user for the input of characters.

In another embodiment, the processor, such as a processor in a TV or set-top box, coupled with the input device automatically switches between text and numeric only mode by determining the context for the inputs. For instance, if the processor is expecting text input, then the processor in the TV or set-top box interprets the codes sent by the input device as text. Likewise, if the processor is expecting numbers, then the processor interprets the codes sent by the input device as numbers.

In another embodiment, the processor, such as a processor in a TV or set-top box, is configured with an electronic dictionary. By using the electronic dictionary, the processor attempts to complete a word being entered by the input device before a user completes the word. For instance, if the user inputs "bu", the processor accesses the dictionary and attempts to complete the word and in this case displays "button". If "button" is the word, the user desires to input, then the user selects the enter key to complete the word. However, if the word displayed is not the input desired by the user, the user continues to input additional letters. The processor will continue access the dictionary and attempt to complete the word until the word is complete.

Although the input device illustrated in FIG. 1 resembles a remote control for a TV, VCR or computer, other input devices such as keypads on a cellular phone is also used with the present invention.

Figure 2:
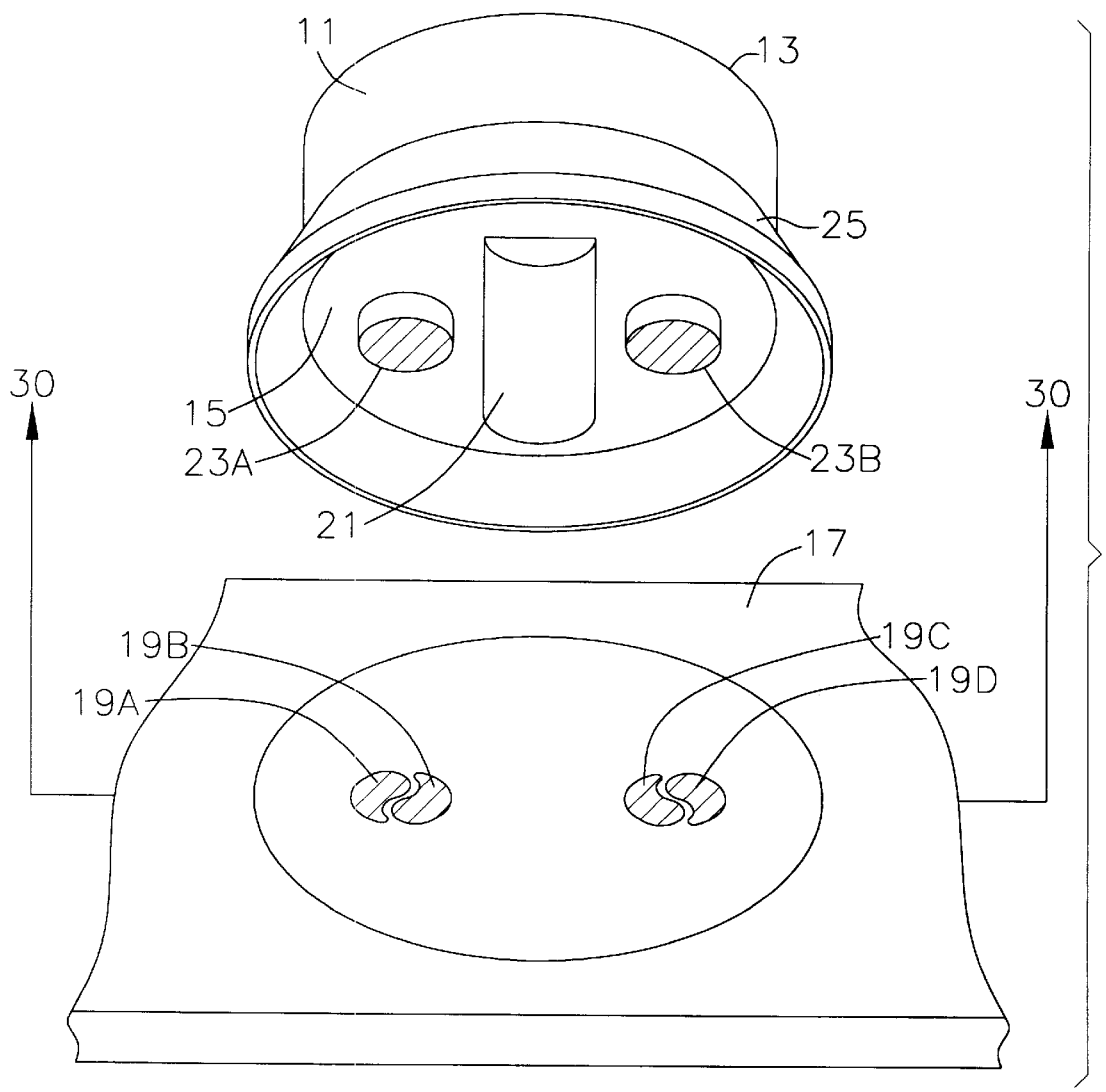
FIG. 2 illustrates an exploded view of an embodiment of the multiple input key.

FIG. 2 illustrates an exploded view of an embodiment of one of the multiple input keys in FIG. 1. The multiple input key has a body 11, having a top surface 13 and a bottom surface 15. The bottom surface 15 is closest to a printed circuit board 17 and the printed circuit board has electrical leads 19A–19D. Extending from the bottom surface 15 of the body 11 is a pivot 21. Adjacent to one side of the pivot 21 is a first contact pad 23A and adjacent to the other side of the pivot is a second contact pad 23B. The bottom of the contact pads 23A,B closest to the printed circuit board are made of an electrically conductive material. The pivot 21 extends farther from the bottom surface 15 towards the printed circuit board 17 than the contact pads 23A–23B. The leads 19A,B are positioned on the printed circuit board to provide a unique electrically conducting lead pair to be associated with the first contact pad 23A. Likewise, leads 19C,D are positioned on the printed circuit board to provide a second unique electrically conducting lead pair to be associated with the second contact pad 23B.

The multiple input key including the body 11 and the pivot 21, is made of rubber or another resilient material. Surrounding the periphery of the body of the key is a skirt 25 that supports the body of the key on printed circuit board. The skirt is also made of rubber or another resilient material.

In another embodiment, the multiple input key including the body, the pivot and the skirt is a portion of a rubber mat. The rubber mat covers the same top surface area as the housing (shown in FIG. 1). However, instead of having openings like the housing, the rubber mat contains protrusions extending through the openings in the housing. Therefore, the rubber mat acts as the body, the top surface, the bottom surface, the pivot and the skirt of the multiple input keys of the input device.

Figure 3:
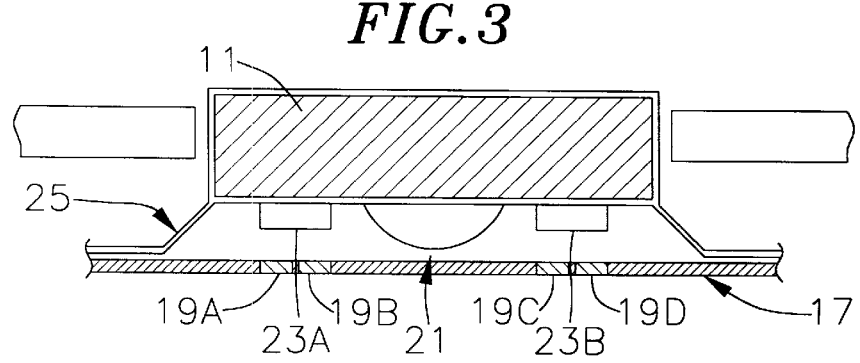
FIG. 3 illustrates a cross-sectional view of one of the embodiments of the multiple input key taken along line 30—30 of FIG. 2.

FIG. 3 illustrates a cross-sectional view of the multiple input key taken along the line 30—30 of FIG. 2. In FIG. 3, the skirt 25 supports the body of the key on the printed circuit board and the pivot 21 extends from the bottom surface 15 of the body 11 of the key farther than the contact pads 23A,B. In a neutral state, i.e. no pressure is exerted on the key, the contact pads 23A,B and the pivot 21 do not make contact with the printed circuit board 17. If pressure is applied to the key, the pivot 21 contacts the printed circuit board. The pivot contacting the printed circuit board provides a pivot point such that the key is pivoted about that point. Additionally, the pivot reduces the chance that the first contact pad 23A will contact the leads 19A,B while the second contact pad contacts leads 19C,D and vice versa.

Pressure exerted by a user on one of the edges of the top surface of the key or one of the sides of the key, pivots the key and causes either the first contact pad 23A to contact the leads 19A,B or causes the second contact pad 23B to contact the leads 19C,D. When the first contact pad 23A contacts the leads 19A,B on the printed circuit board, the leads 19A,B are shorted and a circuit is closed. When the second contact pad 23B contacts the leads 19C,D on the printed circuit board, the leads 19C,D are shorted and a circuit is closed.

If an additional amount of pressure is applied by the user to the middle of the key, the pivot 21 deforms such that the first contact pad 23A contacts the leads 19A,B and the second contact pad 23B contacts the leads 19C,D simultaneously. Accordingly, the leads 19A,B are shorted and a circuit is closed and the leads 19C,D are shorted and another circuit is closed.

FIRST CONTACT OPERATION

The microprocessor coupled with the multiple input key interprets the circuits closed by the contact pads 23A,B contacting with the leads 19A–D. As previously described, the input device operates in two modes, a numerical only mode and a text mode, which is definable by using the shift or shift lock key. In numeric only mode, the microprocessor will interpret any combination of circuits closed by the contact pads 23A,B being connected with the leads as a numerical value. For instance, when the input device is in numeric only mode and pressure is exerted on the number 2 key 3B (shown in FIG. 1) causing a contact pad to contact leads, the microprocessor interprets the circuit closed as the number 2 being inputted.

In text mode, the microprocessor will interpret the circuits closed by the contact pads 23A,B contacting the leads 19A–D as text or symbol input. For instance, the number 2 key 3B (shown in FIG. 1), has associated labels corresponding to the letters A, B, and C and when pressure is applied on the left edge of the top surface of the key, the first contact pad 23A contacts the leads 19A,B on the printed circuit board. The microprocessor interprets the circuit closed by the first contact pad connecting with the leads as the letter "A" being inputted. When pressure is applied to the right edge of the top surface of the key, the second contact pad 23B contacts the leads 19C,D and the microprocessor interprets the circuit closed as the letter "C" being inputted. When pressure is applied to the middle of the top surface of the key causing the pivot to deform and both the first and the second contact pads 23A,B contact the associated leads 19A–D on the printed circuit board, the microprocessor interprets the circuit closed as the letter "B" being inputted.

Table 1 summarizes the possible connections of the number 2 key 3B (shown in FIG. 1) and one potential interpretation by the microprocessor of the circuits closed based on the mode the input device is in.

TABLE 1

| First Contact | Second Contact | Text Mode | Numeric Mode |
|---|---|---|---|
| Open | Open | None | None |
| Open | Closed | C | 2 |
| Closed | Open | A | 2 |
| Closed | Closed | B | 2 |

In Table 1, "Open" means that the contact pad is not connected to leads and "Closed" means that a contact pad is connected to leads. As previously described, when no pressure is exerted on the key, no contact is made between any of the contact pads 23A,B with the leads 19A–D and the key is considered to be in a neutral position. Accordingly, the processor only responds when a connection is made by one or more of the contact pads contacting the associated leads. The connections and interpretation of those connections shown in Table 1 is one of many possible combinations.

TIME BASED OPERATION

In another embodiment, the input device shown in FIG. 1 with the multiple input key shown in FIGS. 2–3 is configured to operate based on time. The input device configured to operate in a time based manner to a large extent operates similarly to the previously described first contact operation. For instance, the number 2 key 3B has associated labels corresponding to the letters A, B, and C and when pressure is applied on the left edge of the top surface of the key by a user, the first contact pad 23A contacts the leads 19A,B on the printed circuit board. The contact of the first contact pad 23A with the leads 19A,B causes the display coupled with the input device to display a character, for example, in text mode the letter "A". If the letter "A" is the desired character to be inputted, the user removes pressure from the key, disconnecting the contact pad 23A from the leads 19A,B for a period of time greater than a predetermined expiration time. As a result, the processor interprets the letter "A" as being entered. The expiration time for example could be half a second. Alternatively, if the letter "A" is the desired character to be inputted, the user removes pressure from the key and another key is depressed and therefore the processor interprets the letter "A" as being entered without waiting for the expiration time.

However, if the letter "A" is not the desired character, the key is pivoted about the pivot 21 breaking the contact of the first contact pad 23A with the leads 19A,B and causing the second contact pad 23B to contact the leads 19C,D. As a result, a new circuit is closed. Provided the amount of time elapsed from the breaking the contact of the first contact pad 23A with the leads 19A,B to closing the new circuit is less then the predetermined expiration time, the letter "C" is displayed. If the letter "C" is the desired character to be inputted, a user removes pressure from the key, disconnecting the contact pad 23B from the leads 19C,D for a period of time greater than a predetermined expiration time. As a result, the processor interprets the letter "C" as being entered. Alternatively, if the letter "C" is the desired character to be inputted, the user removes pressure from the key and another key is depressed and therefore the processor interprets the letter "C" as being entered without waiting for the expiration time.

If the letters "C" or "A" are not the desired character, the key is depressed deforming the pivot 21 to cause the first and second contact pads 23A,B to contact the respective leads 19A–D simultaneously and therefore closing their respective circuits. As a result, the letter "B" is displayed. If the letter "B" is the desired character to be inputted, a user removes pressure from the key, disconnecting the first and second contact pads 23A,B from the respective leads 19A–D for a period of time greater than the predetermined expiration time. As a result, the processor interprets the letter "B" as being entered. Alternatively, if the letter "B" is the desired character to be inputted, the user removes pressure from the key and another key is depressed and therefore the processor interprets the letter "B" as being entered without waiting for the expiration time. Accordingly, the multiple input key is manipulated in a time based manner until the desired character is displayed and inputted. Therefore, the input device configured to operate in a time based manner allows a user to pivot the key to different characters on the same key until the desired character is displayed. Then upon release of the key for a predetermined time, or when another key is pressed the last character displayed is entered.

In numeric only mode, since only one number is assigned per key, only the number assigned to the key will be displayed. Accordingly, when the user removes pressure from the key disconnecting the first, second or both contact pads 23A,B from their respective leads 19A–D, the processor interprets the number assigned as being entered without waiting for the expiration time.

MODELESS OPERATION

In another embodiment, the input device shown in FIG. 1 with the multiple input keys shown in FIGS. 2–3 is configured to operate in a modeless manner and thereby not have a text or numeric only mode. In other words, the shift key 5 and the shift lock key 4 would not be needed. The input device configured to operate in a modeless manner to a large extent operates as the previously described input device having a text and a numeric only mode operating in a time based manner or a first contact manner.

In a first contact or time based modeless operating input device, if pressure is applied on the left edge of the top surface of the key, the contact pad 23A contacts the leads 19A,B on the printed circuit board and if pressure is not removed after a predetermined time period such as one second, the display responds by displaying the number 2 instead of the letter "A", In a first contact modeless operating input device, if the number 2 is the desired character to be inputted then pressure is removed from the key causing the microprocessor to interpret the number 2 as being inputted by the input device.

In a time based modeless operating input device, if the number 2 is the desired character to be inputted, pressure is removed from the key, disconnecting the contact pad 23A from the leads 19A,B for a period of time greater than a predetermined expiration time. As a result, the processor interprets the number 2 as being entered. Alternatively, pressure is removed from the key and another key is depressed such that the processor interprets the number 2 as being entered without waiting for the expiration time. Therefore, without the use of a shift key or a shift lock key, a number or a letter is inputted by the input device. Similarly, the second contact pad 23B contacting the leads 19C,D or both the first and second contact pad 23A,B contacting the respective leads 19A–D could be configured to operate in the same manner. Accordingly, the multiple input key in this time based modeless operation could provide for three more connections or states. Table 2 summarizes one possible combination of interpretations made by the processor of the connections made by the contact pads and the leads of an input device operating in a modeless manner.

TABLE 2

| First Contact | Second Contact | Key Hold Time (Short) | Key Hold Time (Long) |
| --- | --- | --- | --- |
| Open | Open | None | None |
| Open | Closed | C | + |
| Closed | Open | A | 2 |
| Closed | Closed | B | = |

In Table 2, "Open" means that a contact pad is not connected to any of the leads and "Closed" means that a contact pad is connected to electrical leads.

In another embodiment, the input device shown in FIG. 1 with the multiple input keys shown in FIGS. 2–3 is coupled with a processor which is configured to operate using smart punctuation. The processor configured using smart punctuation has a set of linguistic rules to properly place or replace punctuation symbols such as placing periods at the end of a sentence. As such, by using smart punctuation, the processor attempts to automatically place or replace punctuation characters entered by the input device. For instance, if the user wants to input the word "can't", the user inputs the letters "can" using the multiple input keys as previously described. Next the user depresses the symbol key 9 or a quick symbol key 6 to choose a punctuation symbol and then the user continues to complete the word followed by a space. If the user incorrectly punctuated the word, such as "can!t", the processor using the linguistic rules corrects the punctuation by overwriting the display with "can't".

In another embodiment, the input device includes a smart punctuation key similar to the quick symbol key 6. Using the previous example, if the user wants to input the word "can't", the user inputs the letters "can" using the multiple input keys. Next the user depresses the smart punctuation key inserting a placeholder for punctuation and then the user continues to complete the word followed by a space. The processor using the linguistic rules replaces the placeholder for the punctuation with the appropriate punctuation symbol in this case an apostrophe.

In another embodiment, the input device is configured to operate in a modeless manner, such that the shift key and the shift lock key is not needed. The shift key and the shift lock key are then configured to operate as standard keyboard shift and shift lock keys, switching the text input between lowercase and uppercase characters. Therefore, a user is able to input text such as sentences and proper names with proper capitalization. Furthermore, an input device with smart punctuation is able to automatically place or replace punctuation characters entered by a user based on the capitalization and non-capitalization of the text inputted such as placing periods at the end of a sentence. For instance, if a user wants to input the partial phrase "device. Multiple", the user inputs the word "device" using the multiple input keys. Next the user depresses the symbol key 9 or a quick symbol key 6 to choose a punctuation symbol and then the user continues to complete the next word followed by a space. If the user incorrectly punctuated the partial phrase, such as "device, Multiple", the processor using the linguistic rules corrects the punctuation by overwriting the display with "device. Multiple".

In another embodiment, the input device just described could further include a smart punctuation key similar to the quick symbol key 6. Therefore, if the user wants to input the partial phrase "device. Multiple", the user inputs the word "device" using the multiple input keys. Next the user depresses the smart punctuation key inserting a placeholder for punctuation and then the user continues to complete the phase followed by a space. The processor using the linguistic rules replaces the placeholder for the punctuation with the appropriate punctuation symbol, in this case an period.

In another embodiment, the input device includes an uppercase and lowercase shift key similar to the shift key on a standard keyboard and an uppercase and lowercase shift lock key similar to a shift lock key on a standard keyboard. Therefore, the input device could operate in a text or numeric only mode using the shift key 4 and the shift lock key 5 (shown in FIG. 1) and the upper and lowercase shift and shift lock keys switches the text input between lowercase and uppercase characters. As a result, a user is able to input text such as sentences and proper names with proper capitalization using the upper and lowercase shift and shift lock keys. Furthermore, an input device with smart punctuation is able to automatically place or replace punctuation characters entered by a user based on the capitalization and non-capitalization of the text inputted such as placing periods at the end of a sentence.

Figure 4:
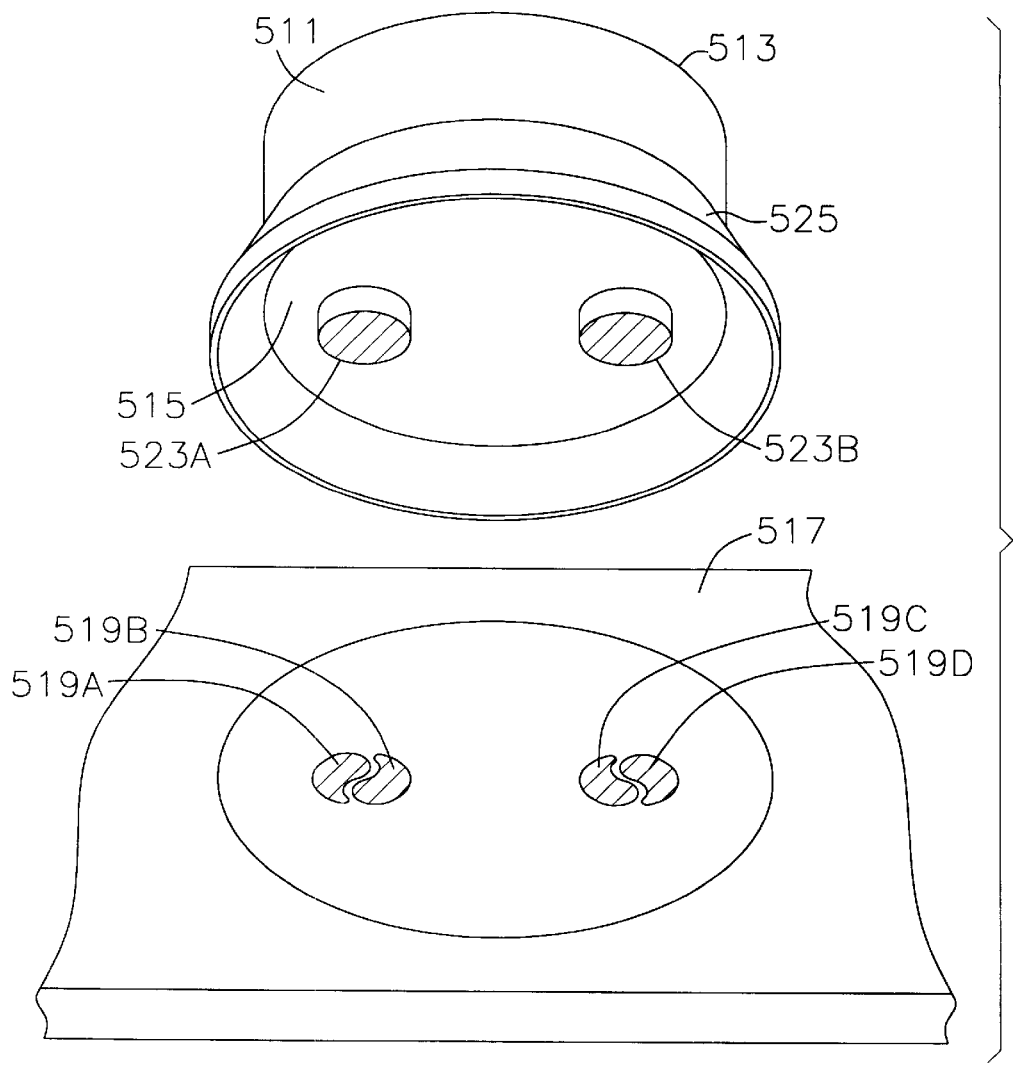
FIG. 4 illustrates an exploded view of another embodiment of the multiple input key.

FIG. 4 illustrates an exploded view of another embodiment of one of the multiple input keys in FIG. 1. The multiple input key has a body 511, having a top surface 513 and a bottom surface 515. The bottom surface 515 is closest to a printed circuit board 517 and the printed circuit board has electrical leads 519A–519D. Extending from the bottom surface 515 of the body 511 is a first contact pad 523A and a second contact pad 523B. The leads 519A,B are positioned on the printed circuit board to provide a unique lead pair to be associated with the first contact pad 523A. Likewise, leads 519C,D are positioned on the printed circuit board to provide a second unique lead pair to be associated with the second contact pad 523B. Surrounding the periphery of the body of the key is a skirt 525 that supports the body of the key on printed circuit board. The skirt is made of rubber or another resilient material.

In a neutral state, i.e. no pressure is exerted on the key, the contact pads 523A,B do not make contact with the printed circuit board 517. Pressure exerted by a user on the top surface of the key or the sides of the key, causes either the first contact pad 523A to contact the leads 519A,B or causes the second contact pad 523B to contact the leads 519C,D. When the first contact pad 523A contacts the leads 519A,B on the printed circuit board, the leads 519A,B are shorted and a circuit is closed. When the second contact pad 523B contacts the leads 519C,D on the printed circuit board, the leads 519C,D are shorted and a circuit is closed.

If an additional amount of pressure is applied by the user to the middle of the key, the skirt deforms such that the contact pads 523A,B contact the respective leads 519A–D on the printed circuit board simultaneously. When the first contact pad 523A contacts the leads 519A–B, the leads are shorted and a circuit is closed. Similarly, when the second contact pad 523B contacts the leads 519C–D, the leads are shorted and a circuit is closed.

Figure 5:
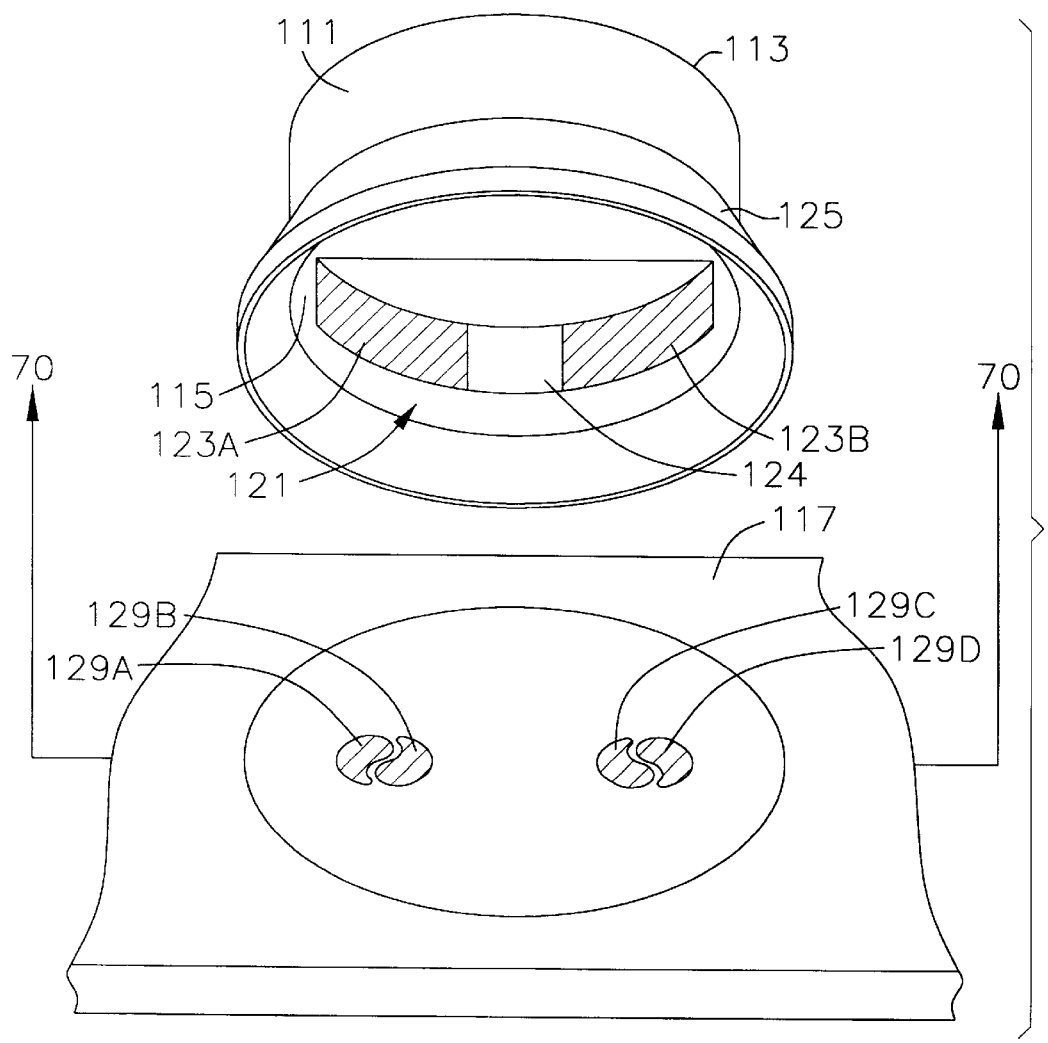
FIG. 5 illustrates an exploded view of another embodiment of the multiple input key.

FIG. 5 illustrates an exploded view of another embodiment of the multiple input key shown in FIG. 1. In FIG. 5, the multiple input key has a body 111 with a skirt 125 surrounding the periphery of the body 111. The skirt supports the body on the printed circuit board 117. The skirt is made of rubber or another resilient material. The body has a top surface 113 and a bottom surface 115. The bottom surface being near the printed circuit board has a curved pivot 121 extending from the bottom surface of the body. The curved pivot 121 has a first contact pad 123A and a second contact pad 123B. The first contact pad 123A curves along one portion of the curved pivot. The second contact pad 123B curves along another portion of the curved pivot. In between the first contact pad and the second contact pad is a tip portion 124. The tip portion of the curved pivot covers the area on the curved pivot farthest from the bottom surface of the key but closest to the printed circuit board. The tip portion 124 further separates the first contact pad and the second contact pad, thereby preventing the first contact pad 123A from being electrically connected with the second contact pad 123B. The curved pivot extends along the bottom surface of the key and spans the distance between leads 129A–D on the printed circuit board.

When pressure is exerted on the top surface 113 of the key, the tip portion 124 of the curved pivot 121 contacts the printed circuit board and permits the key to tilt. As the key pivots about the curved pivot, the pressure exerted on one edge of the key causes the first contact pad 123A on the curved pivot to contact the leads 129A,B and thereby a circuit is closed. Alternatively, pressure exerted on the other edge of the key causes the second contact pad 123B on the curved pivot to contact the leads 129C,D and thereby a circuit is closed. If pressure is exerted on the middle of the top surface of the key, the curved pivot deforms and the first contact pad 123A contacts the leads 129A,B and the second contact pad 123B contacts the leads 129C,D. Accordingly, when the first contact pad 123A contacts the associated leads 129A,B, a circuit is closed and when the second contact pad 123B contacts the associated leads 129C,D, a circuit is closed.

Figure 6:
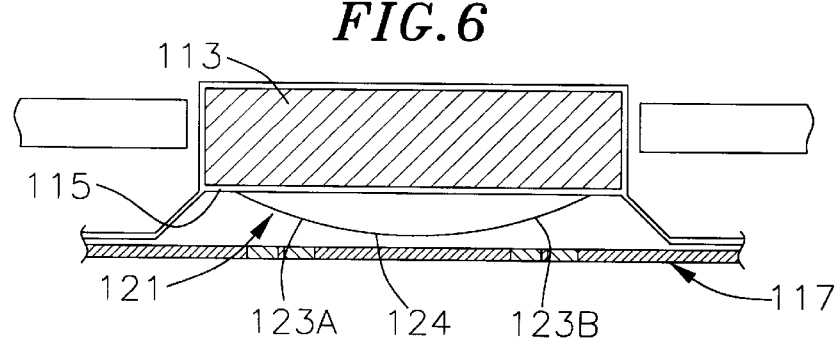
FIG. 6 illustrates a cross-sectional view of one of the embodiments of the multiple input key taken along line 70—70 of FIG. 5.

FIG. 6 illustrates a cross-sectional view of the multiple input key taken along line 70—70 of FIG. 5. In FIG. 6, the curved pivot 121 with the contact pad 123A,B extends beyond the bottom surface 115 of the body 113 of the key and in a neutral position does not contact the printed circuit board 117. Furthermore, the tip portion 124 of the curved pivot extends farther from the bottom surface of the body than the edges of the curved pivot and is closest to the printed circuit board. Therefore, as pressure is applied to the top surface of the key, the tip portion of the curved pivot contacts the printed circuit board and allows the key to pivot about the tip portion of the pivot.

Figure 7:
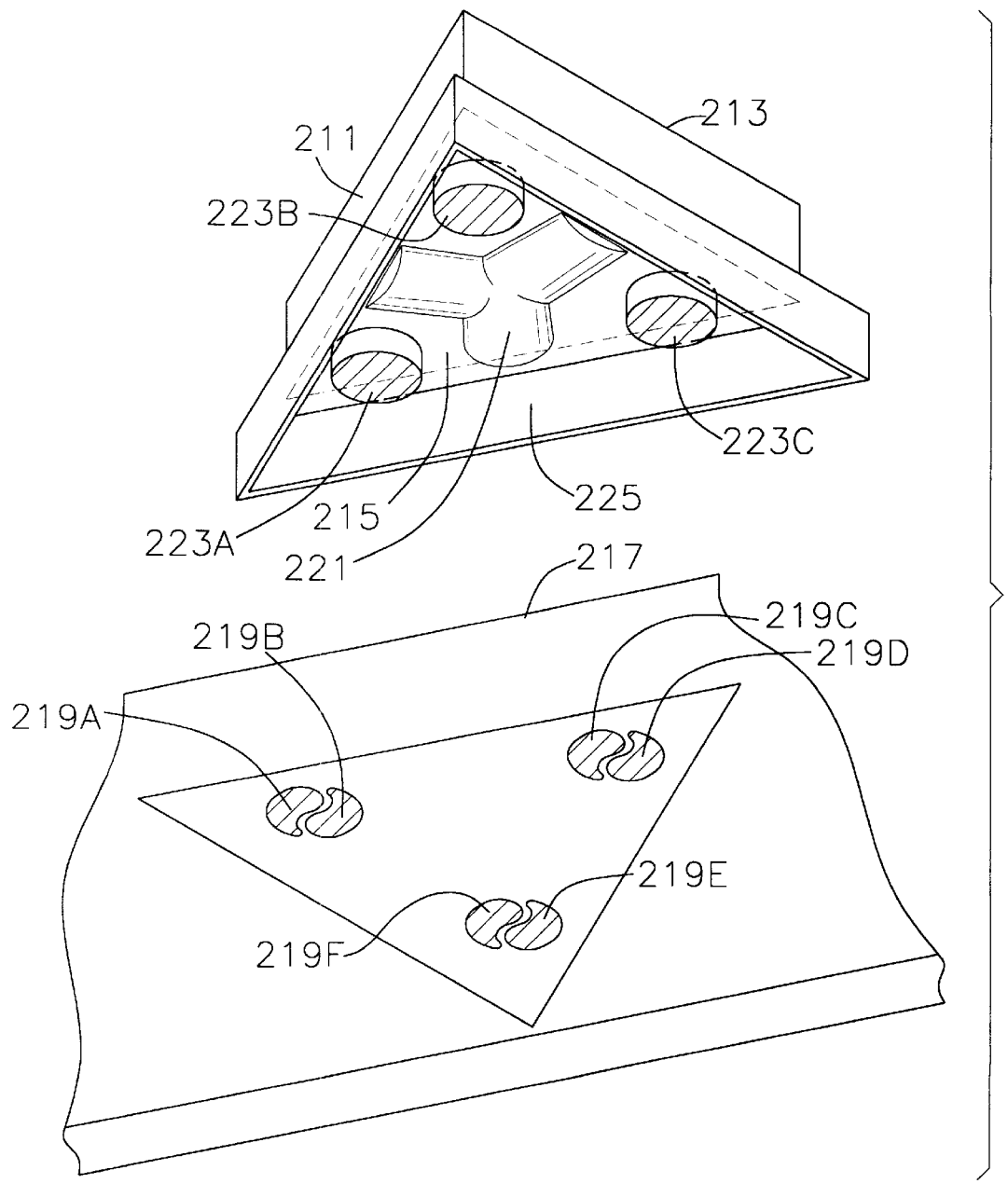
FIG. 7 illustrates an exploded view of another embodiment of the multiple input key.

FIG. 7 illustrates an exploded view of another embodiment of the multiple input key of FIG. 1. The multiple input key in FIG. 7 has a body 211 which is triangular in shape. The triangular shaped body has a top surface 213 and a bottom surface 215. Extending from the bottom surface of the triangular shaped body and situated on each vertices of the triangular shaped body are contact pads 223A–C. Also extending from the bottom surface of the triangular shaped body is a Y-shaped pivot 221.

The Y-shaped pivot extends closer to the printed circuit board 217 than the contact pads and touches the printed circuit board when pressure is exerted on the key. The Y-shaped pivot allows for the key to tilt when pressure is exerted on one of the vertices of the triangular shaped key and thereby allows a first contact pad 223A to contact the associated contact leads 219A,B on the printed circuit board. Also, the Y-shaped pivot prevents the contact pads 223B,C on the other vertices of the triangular shaped body from contacting the other leads 219C–F on the printed circuit board when pressure is exerted on one of the vertices of the triangular shaped key.

If pressure is exerted on the middle of the top surface of the triangular shaped body, the Y-shaped pivot deforms allowing all the contact pads 223A–C on the vertices of the triangular shaped body to contact the leads 219A–F on the printed circuit board. Surrounding the periphery of the body 211 of the key is a skirt 225 which supports the body of the key on printed circuit board. The skirt is made of rubber or another resilient material.

FIG. 7 illustrates by way of example that the shape of the body of the key is not limited to round or triangular, but can be any other shapes such as an oval. Also, the shape of the pivot is not limited to a curve or Y-shaped, but can be any other shapes such as rectangular, triangular or cylindrical.

The embodiments of the multiple input keys illustrated in FIGS. 4–7, is configured to operate based on time or first contact or in mode or modeless manner as previously described in the context of the embodiment of the multiple input key illustrated in FIGS. 2–3. Accordingly, the embodiments of multiple input keys illustrated in FIGS. 4–7 allow a user to input text using a few keys which are simple to operate and construct.

Figure 8:
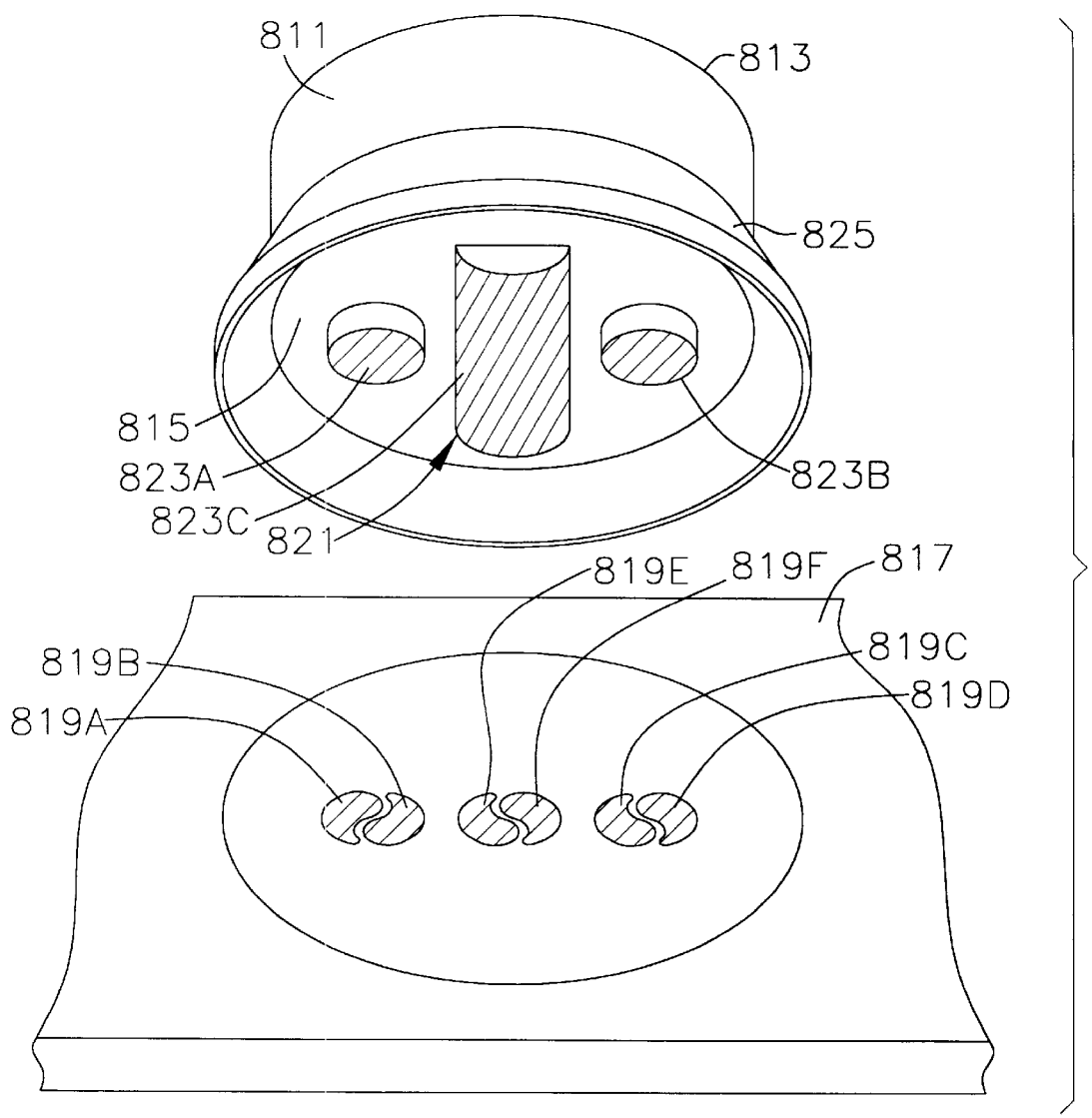
FIG. 8 illustrates an exploded view of another embodiment of the multiple input key.

FIG. 8 illustrates an exploded view of an embodiment of one of the multiple input keys in FIG. 1. The multiple input key has a body 811, having a top surface 813 and a bottom surface 815. The bottom surface 815 is closest to a printed circuit board 817 and the printed circuit board has electrical leads 819A–819F. Extending from the bottom surface 815 of the body 811 is a pivot 821 and at the end of the pivot 821 is a contact pad 823C. Adjacent to one side of the pivot 821 is a first contact pad 823A and adjacent to the other side of the pivot is a second contact pad 823B. The pivot 821 extends farther from the bottom surface 815 towards the printed circuit board 817 than the contact pads 823A–823B. The leads 819A,B are positioned on the printed circuit board to provide a unique lead pair to be associated with the first contact pad 823A. Likewise, leads 819C,D are positioned on the printed circuit board to provide a second unique lead pair to be associated with the second contact pad 823B. Furthermore, leads 819E,F are positioned on the printed circuit board to provide a third unique lead pair to be associated with the third contact pad 823C. Surrounding the periphery of the body of the key is a skirt 825 that supports the body of the key on printed circuit board. The skirt is made of rubber or another resilient material.

In a neutral state, i.e. no pressure is exerted on the key, the contact pads 823A–C do not make contact with the printed circuit board 817. If pressure is applied to the key, the contact pad 823C on the pivot 821 contacts the printed circuit board. The pivot contacting the printed circuit board provides a pivot point such that the key is pivoted about that point. Additionally, the pivot reduces the chance that the first contact pad 823A will contact the leads 819A,B while the second contact pad contacts leads 819C,D and vice versa.

The embodiment of the multiple input key illustrated in FIG. 8, is configured to operate based on time or first contact or in mode or modeless manner as previously described in the context of the embodiment of the multiple input key illustrated in FIGS. 2–3. Accordingly, this embodiment of multiple input key allows a user to input text using a few keys which are simple to operate and construct. Furthermore, this embodiment of the multiple input key also provides another operational advantage to a user of which is described below.

PIVOT CONNECTION OPERATION

In another embodiment, the input device shown in FIG. 1 has the embodiments of the multiple input keys shown in FIG. 8. With the multiple input key having a pivot 821 with a pivot contact pad 823C and associated electrical leads 819E,F, the input device is configured to operate in a pivot connection manner. The input device configured to operate in a pivot connection manner to a large extent operates similarly to the previously described types of operations.

For instance, the number 2 key 3B has associated labels corresponding to the letters A, B, and C and when pressure is applied to the top sace 813 of the key, the pivot contact pad 823C contacts the leads 819E,F on the printed circuit board and a circuit is closed. The contact of the pivot contact pad 823C with the leads 819E,F causes the display coupled with the input device to display a character, for example, the letter "B".

If the letter "B" is the desired character to be inputted, pressure is removed from the key, disconnecting the pivot contact pad 823C from the leads 819E,F. As a result, the processor interprets the letter "B" as being entered. However, if the letter "B" is not the desired character, the key is pivoted while maintaining contact of the pivot contact pad 823C with the leads 819E,F and causing the first contact pad 823A to contact the leads 819A,B or the second contact pad 823B to contact the leads 819C,D.

The contact of the first or the second contact pad with their respective leads causes the display coupled with the input device to display a different character. For example, when the first contact pad 832A is in contact with the leads 819A,B, the letter "A" is displayed. If the letter "A" is the desired character to be inputted, pressure is removed from the key, disconnecting the first contact pad from its associated leads and the pivot contact pad 823C from the leads 819E,F. As a result, the processor interprets the letter "A" as being entered.

However, if the letter "A" is not the desired character, the key is pivoted while maintaining contact of the pivot contact pad 823C with the leads 819E–F and causing the second contact pad 823B to contact the leads 819C–D. As a result, a new circuit is closed and the letter "C" is displayed. Additionally, the key is pivoted such that only the pivot contact pad 823C is in contact with the associated leads 819E,F.

In another embodiment, the pivot contact pad 823C deforms when the key is depressed such that the first contact pad 823A contacts the leads 819A–B and the second contact pad 823B contacts the leads 819C–D simultaneously. As a result, two circuits are closed and the character "B" is displayed.

Once the desired character is displayed, pressure is removed from the key, disconnecting the pivot contact pad 823C from the leads 819E–F. As a result, the processor interprets the letter displayed as being entered. Accordingly, a user is able to manipulate the multiple input key until the desired character is displayed and upon release of the key is inputted without waiting for a predetermined time to pass or another key to be pressed.

The input device is further configured to operate in a mode or modeless manner. As previously described, the input device is configured to operate in a text mode or a numeric only mode to ease the operation of inputting alphanumeric information. With the pivot connection operation, in numeric only mode, the characters displayed would only be numbers. Conversely, with the pivot connection operation, in text mode, the characters displayed would be letters, numbers and selected symbols.

In a modeless manner, the pivot connection operation would not change, the characters displayed would letters, numbers, or symbols. Alternatively, the pivot connection operation could be modified to operate in a modeless manner by displaying initially only letters. Numbers or symbols would be displayed when a specific time period has past in which the first contact pad, second contact pad, or the pivot contact pad is contacting their respective leads. In another embodiment, numbers or symbols would be displayed when a specific time period has past in which the first contact pad, second contact pad, or both contact pads are contacting their respective leads while the contact between the pivot contact pad and its associated leads are maintained.

In another embodiment of the multiple input keys having a pivot 821 with a pivot contact pad 823C and associated electrical leads 819E,F, the input device is configured to operate in a pivot connection manner with an associated time tolerance. For instance, if a user applies pressure to a number 2 key associated with the letters A, B, and C, the pivot contact pad 823C contacts the leads 819E,F on the printed circuit board and a circuit is closed. The contact of the pivot contact pad 823C with the leads 819E,F causes the display coupled with the input device to display a character, the letter "B". However, if within a specified time period such as a half a second, the first contact pad 823A contacts the leads 819A,B and the letter "A" is displayed instead of the letter "B".

Alternatively, if within a specified time period, the second contact pad 823B contacts the leads 819C,D and the letter "C" is displayed instead of the letter "B". When the desired character is displayed, the user removes pressure from the key, disconnecting the pivot contact pad 823C from the leads 819E–F. As a result, the processor interprets the letter displayed as being entered. Accordingly, in this manner the multiple input key is manipulated until the desired character is displayed and inputted. Therefore, a user is able to input text using a few keys which are simple to operate and construct.

Figure 9:
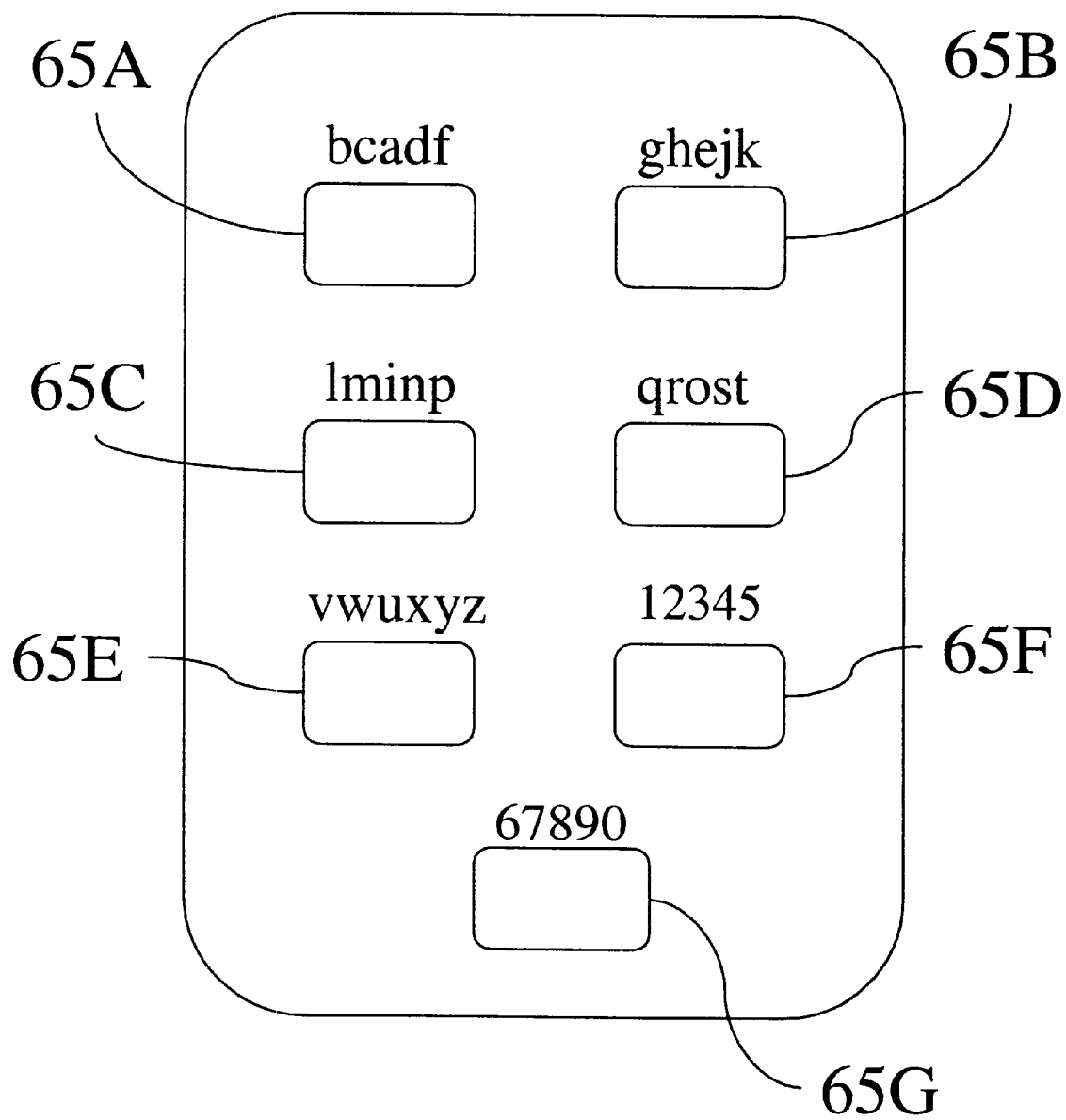
FIG. 9 illustrates a top view of another embodiment of the device for inputting characters of the present invention.

FIG. 9 illustrates a top view of an embodiment of an input device configured with five multiple input keys 65A–E assigned six letters such that the 26 letters in the English alphabet is covered by the five keys. The input device also has two multiple input keys 65F–G assigned numbers 0–9. The multiple input keys 65A–G are configured similarly as the embodiment of the multiple input key illustrated in FIG. 8 in both structure and operation. Accordingly, the input device of the present invention having multiple input keys with a multitude of contact pads and associated leads can be configured in a variety of ways to provide text input for many types of electronic equipment.

In FIG. 9, the multiple input key 65A has associated labels corresponding to the letters B, C, A, D, and F and when pressure is applied to the top surface of the key, the pivot contact pad contacts the leads on the printed circuit board and a circuit is closed. The contact of the pivot contact pad with the leads causes the display coupled with the input device to display the set of characters associated with the key, for example, the letters "BCADF". One of the letters such as "A" is displayed in a manner to make the letter "stand out" from the other characters such as highlighting the character or a cursor pointing to the character. The input device could be configured to initially display any other character, however, it is preferable that the letter most frequently used such as vowels be the first character displayed.

If the highlighted letter "A" is the desired character to be inputted, pressure is removed from the key, disconnecting the pivot contact pad from the leads. As a result, the processor interprets the letter "A" as being entered. However, if the letter "A" is not the desired character, the key is pivoted while maintaining contact of the pivot contact pad with the leads and causing a first or second contact pad to contact their respective leads. The next character highlighted to a large extent follows the directional movement of the pivoting of the key. For instance, if the key is pivoted to the left, a character to the left is highlighted and if the key is pivoted to the right, a character to the right is highlighted.

As such, the contact of the first contact pad with the associated leads causes the display coupled with the input device to highlight the character to the left of the initially highlighted character, for example, the letter "C". Alternatively, the contact of the second contact pad with the associated leads causes the display coupled with the input device to highlight the character to the right of the initially highlighted character, for example, the letter "D".

Whichever, contact is made, the second contact pad with the associated leads or the first contact pad with the associated leads, if the highlighted letter "C" or "D" is the desired character to be inputted, pressure is removed from the key, disconnecting the pivot contact pad from the leads. As a result, the processor interprets the highlighted letter as being entered.

Furthermore, while still maintaining the contact between the pivot contact pad with the associated leads and breaking the previous contact of the first or second contact with their respective leads allows the user to highlight a different character. For example, if the contact between the first contact pad with the respective leads was initially made and is now broken by the pivoting of the key and then contact is again made between the first contact pad with the associated leads, the character to the left of the previously highlighted character is displayed, the letter "B". Conversely, if the contact between the first contact pad with the respective leads is broken and then contact is made between the second contact pad with the respective leads, the character to the right of the previously highlighted character is displayed, the letter "A".

Additionally, while still maintaining the contact between the pivot contact pad with the associated leads and not breaking the previous contact of the first or second contact with their respective leads for an extended period of time allows the user to highlight a different character. For example, if the contact between the first contact pad with the respective leads was initially made and is not broken for a second, the character to the left of the previously highlighted character is displayed, the letter "B". If the contact between the first contact pad with the associated leads still maintained for another second, the character to the left of the previously highlighted character is displayed. This manner of highlighting characters continues until the last letter associated to the left of the key is highlighted.

Again, once the desired character is displayed, pressure is removed from the key, disconnecting the pivot contact pad from the leads. As a result, the processor interprets the letter displayed as being entered. Accordingly, in the above described manner the multiple input key is manipulated until the desired character is highlighted and inputted.

Figure 10:
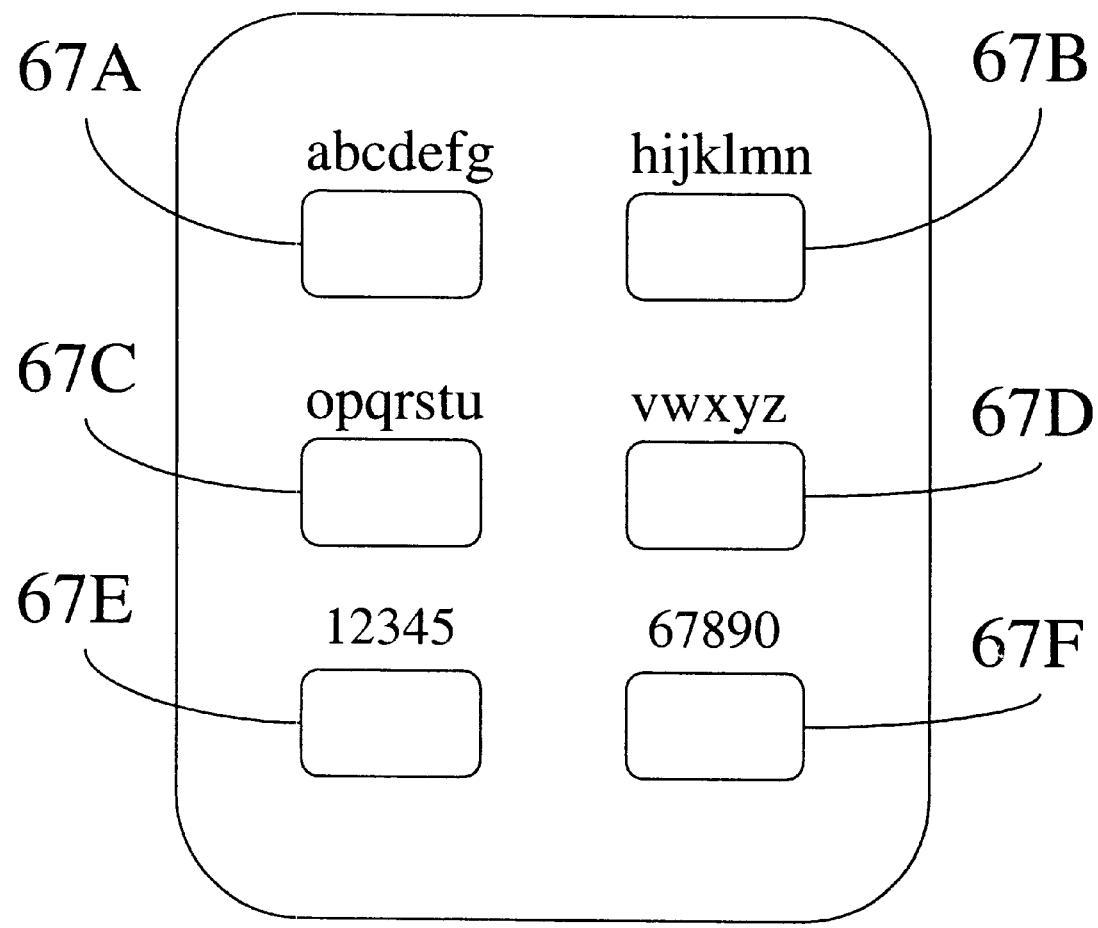
FIG. 10 illustrates a top view of another embodiment of the device for inputting characters of the present invention.

FIG. 10 illustrates a top view of another embodiment of an the input device configured with four multiple input keys 67A–D assigned six to seven letters such that the 26 letters in the English alphabet is covered by the four keys. The input device also has two multiple input keys 67E–F assigned numbers 0–9. The multiple input keys 67A–F are configured similarly as the embodiment of the multiple input key illustrated in FIG. 8 in structure. Additionally, the operation of the keys 67A–F function in the same manner as described above in the context of FIG. 9. Accordingly, the input device illustrated in FIG. 10 allows a user to input text using six keys which are simple to operate and construct.

Figure 11:
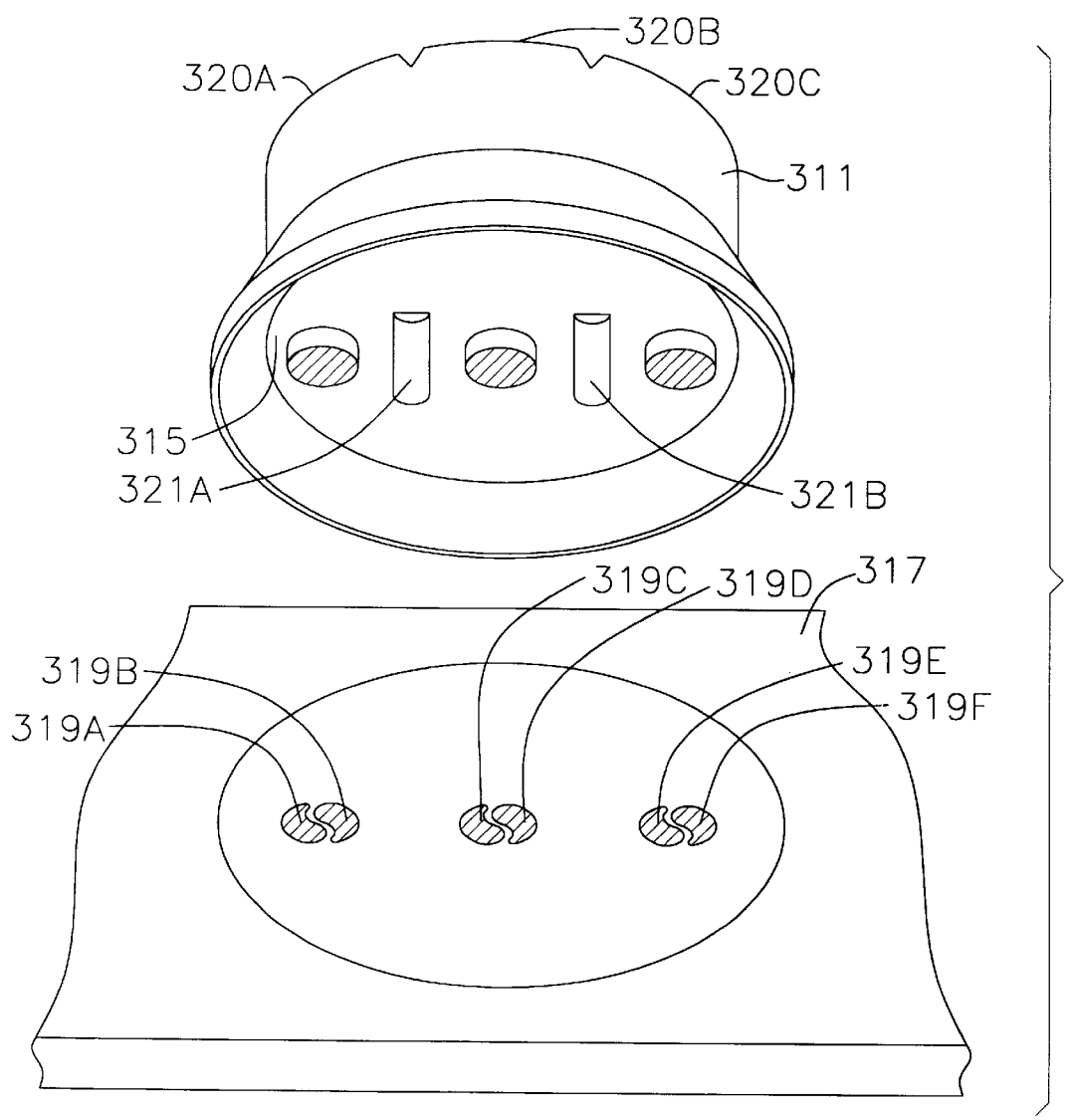
FIG. 11 illustrates an exploded view of another embodiment of the multiple input key.

FIG. 11 illustrates an exploded view of another embodiment of a multiple input key shown in FIG. 1. In FIG. 11, the multiple input key has a body 311 with a top surface 313 and a bottom surface 315. The bottom surface has a first contact pad 323A, a second contact pad 323B, and a third contact pad 323C equally extending from the bottom surface of the body towards the printed circuit board. A printed circuit board 317 has leads 319A–F corresponding to the contact pads 323A–C on the multiple input key. The top surface 313 of the multiple input key is segmented into portions corresponding to the relative positions of the contact pads on the bottom surface 315 of the body.

The segments 320A–C on the top surface of the body provides both a visual and tactile feedback to a user such that when pressure is exerted upon one of the segments, the corresponding contact pad contacts the leads on the printed circuit board. Each segment 320A–C on the top surface of the body of the key is labeled with a letter. Between the first contact pad 323A and the third contact pad 323C is a first ridge 321A extending farther from the bottom surface of the body of the key towards the printed circuit board than the contact pads 323A,C. Between the second contact pad 323B and the third contact pad 323C is a second ridge 321B extending farther from the bottom surface of the body of the key towards the printed circuit board than the contact pads 323B,C. The first ridge 321A reduces the chance that the first contact pad 323A will contact the leads 319A,B while simultaneously the third contact pad 323C contacts leads 319C,D and vice versa. The second ridge 321B reduces the chance that the third contact pad 323C will contact the leads 319C,D while simultaneously the second contact pad 323B contacts leads 319E,F and vice versa.

FIG. 11 illustrates by example that the top surface of the body of the key has different shapes such as segmented sections, concave, convex, flat or flat containing a protrusion within the center of the top surface of the key. Also, the top surface of the body of the key is labeled with letters, numbers, symbols, or specific letters such as vowels or extensively used consonants or symbols.

The embodiment of the multiple input key illustrated in FIG. 11, operates in an independent fashion such that each connection of each contact pad with their respective leads represents a single character. Additionally, the embodiment of the multiple input key illustrated in FIG. 11 is configured to operate based on first contact in a mode or modeless manner. Table 3 summarizes the possible connections of a multiple input key illustrated in FIG. 11 and one potential interpretation by the microprocessor of the circuits closed.

TABLE 3

| Left Contact | Center Contact | Right Contact | Alphanumeric mode | Numeric mode |
| --- | --- | --- | --- | --- |
| Open | Open | Open | None | None |
| Open | Open | Closed | C | 2 |
| Closed | Open | Open | A | 2 |
| Open | Closed | Open | B | 2 |

In Table 3, "Open" means that a contact pad is not connected to any of the leads and "Closed" means that a contact pad is connected to electrical leads. Accordingly, the embodiment of multiple input key illustrated in FIG. 11 provides both a visual and tactile feedback to a user and therefore eases the operation of inputting text by a user.

Figure 12:
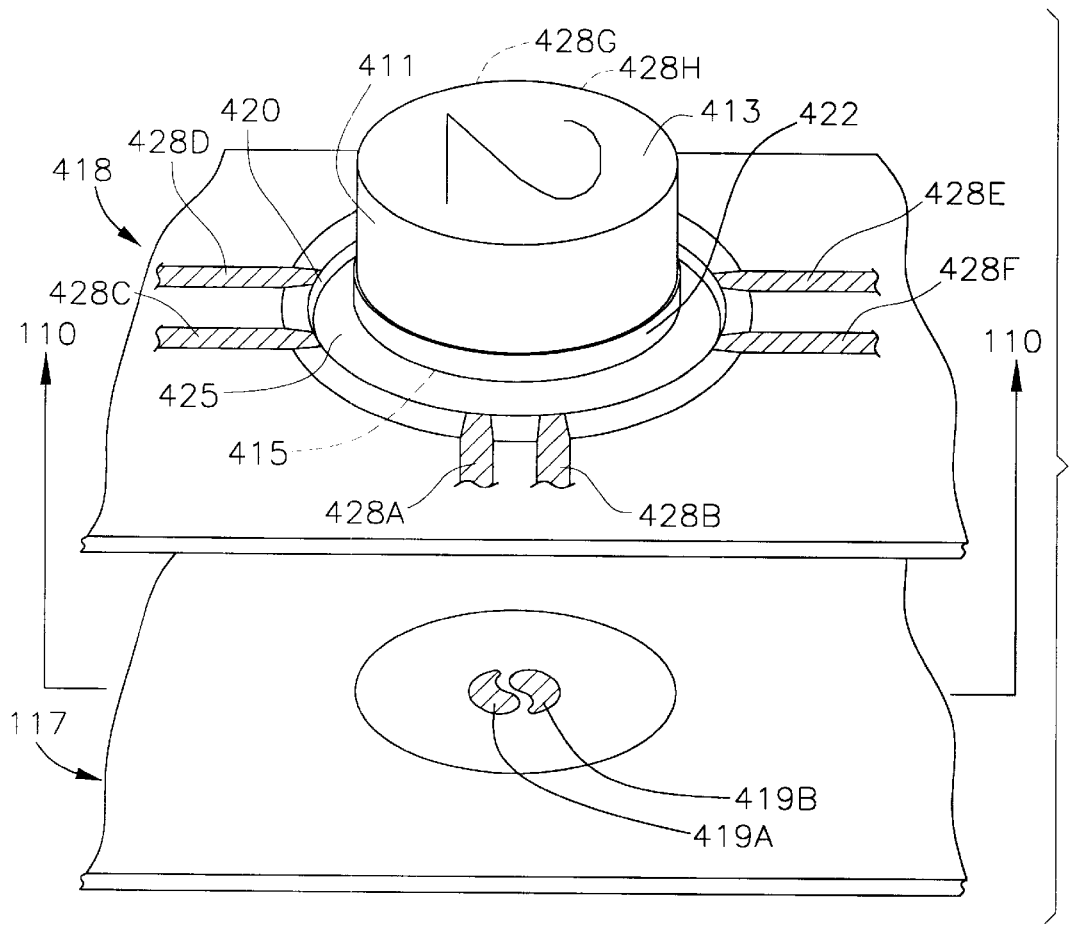
FIG. 12 illustrates an exploded view of another embodiment of the multiple input key.

FIG. 12 illustrates an exploded view of another embodiment of the multiple input key as illustrated in FIG. 1. This embodiment of the multiple input key provides the use of an electrical contact band and leads to create circuit closures in input devices which is useful when the key itself has a limited surface area. In FIG. 12, the multiple input key has a body 411 with a top surface 413 and a bottom surface 415. The bottom surface 415 is near a bottom printed circuit board 417 and the top surface of the body is away from the bottom printed circuit board. A portion of the body extends through an opening 420 in a top printed circuit board 418. The top printed circuit board has a number of openings adapted to allow other multiple input keys to extend through these openings. Surrounding the periphery of the body of the multiple input key is a skirt which supports the body 411 of the key on the bottom printed circuit board 417. The skirt is made of rubber or another resilient material. Also, surrounding the periphery of the body of the key is an electrical contact band 422. The electrical contact band although shown in FIG. 12 as one complete band can be a series of electrically segmented contact bands surrounding the periphery of the body of the key. Furthermore, the body of the key can be made of an electrically conductive material.

The top layer printed circuit board 418 contains a multiple number of electrical leads 428A–H situated at the perimeter of the openings of the top printed circuit board. When pressure is exerted on one of the edges of the top surface 413 of the body of the key, the contact band 422 touches one of the electrical leads 428A–H on the top printed circuit board 418. When the contact band touches the leads on the top printed circuit board a circuit is closed and thereby a microprocessor coupled with the input device interprets the connection as a letter, symbol or number.

Figure 13:
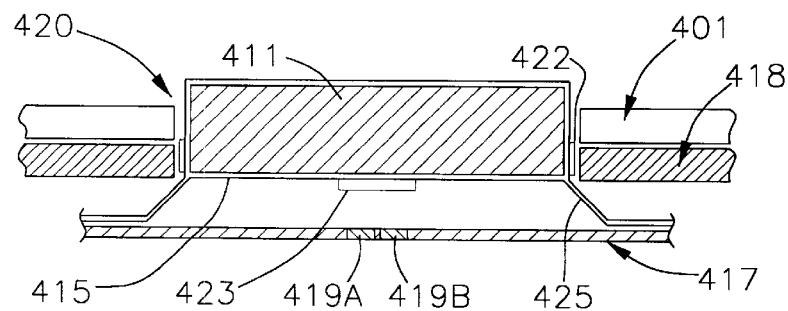
FIG. 13 illustrates a cross-sectional view of one of the embodiments of the multiple input key taken along line 110—110 of FIG. 12.

FIG. 13 illustrates a cross-sectional view of the multiple input key taken along line 110—110 of FIG. 12. In FIG. 13, the skirt 425 coupled with the body 411 of the key supports the body of the key on the bottom printed circuit board 417. The top printed circuit board 418 is situated between the housing 401 and the bottom printed circuit board 417 and contains the opening 420 such that a portion of the body of the key extends through the opening. The contact band 422 is near the top printed circuit board to allow connections to be made with the contact band and the top printed circuit board when the multiple input key is moved.

In one embodiment, a contact pad 423 extends from the bottom surface 415 of the body 411 of the multiple input key and the bottom printed circuit board 417 has electrical leads 419A,B. When pressure is exerted on the middle of the top surface of the body of the key the skirt surrounding the key deforms and the contact pad contacts the electrical leads 419A,B on the bottom printed circuit board. Therefore, a circuit is closed and the microprocessor interprets this connection as a specific character being inputted. Accordingly, this embodiment of the multiple input key is configured to operate based on time or first contact or in mode or modeless manner as previously described in the context of the embodiment of the multiple input key illustrated in FIGS. 2–3.

In another embodiment, a pivot having a contact pad 423 extends from the bottom surface 415 of the body 411 of the multiple input key and the bottom printed circuit board 417 has electrical leads 419A,B. When pressure is exerted on the middle of the top surface of the key the skirt surrounding the key deforms and the contact pad 423 touches the electrical leads 419A,B on the bottom printed circuit board. Therefore, a circuit is closed and the microprocessor interprets this connection as a specific character being inputted. Accordingly, this embodiment of the multiple input key is configured to operate based on first contact or in mode or modeless manner as previously described in the context of the embodiment of the multiple input key illustrated in FIGS. 2–3. Additionally, this embodiment of the multiple input key is configured to operate in a pivot connection manner as previously described in the context of the embodiment of the multiple input key illustrated in FIG. 8. Accordingly, the embodiments of multiple input key described above and illustrated in FIGS. 12–13 allow a user to input text using a few keys with a limited surface area which are simple to operate and construct.

Although FIGS. 12 and 13 illustrate a top printed circuit board having leads 438A–H, the top printed circuit board could be removed and the leads 438A–H are wires or metal posts situated between the housing and the bottom printed circuit board. Furthermore, the bottom printed circuit board could also be replaced with a board or housing with no electrical leads if no contact pad extends from the bottom surface of the key. Although it is preferable that all the embodiments of the multiple input keys have a shirt of resilient material, a mechanical spring or another similar device could be used instead of the skirt.

Figure 14:
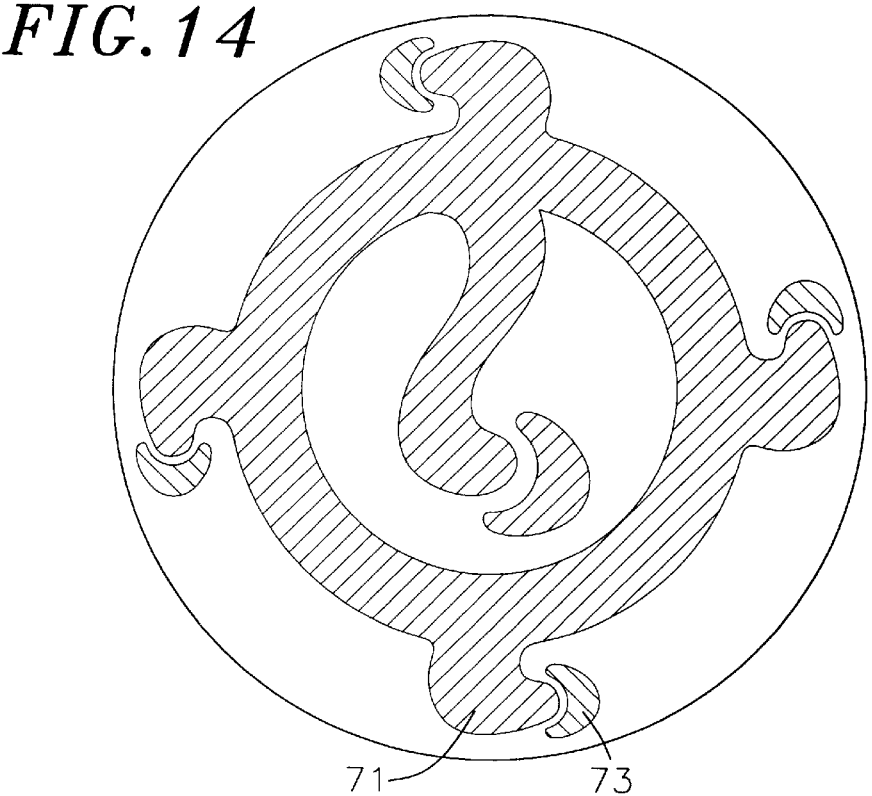
FIG. 14 illustrates a top view of an embodiment of electrical leads in the present invention.
Figure 15:
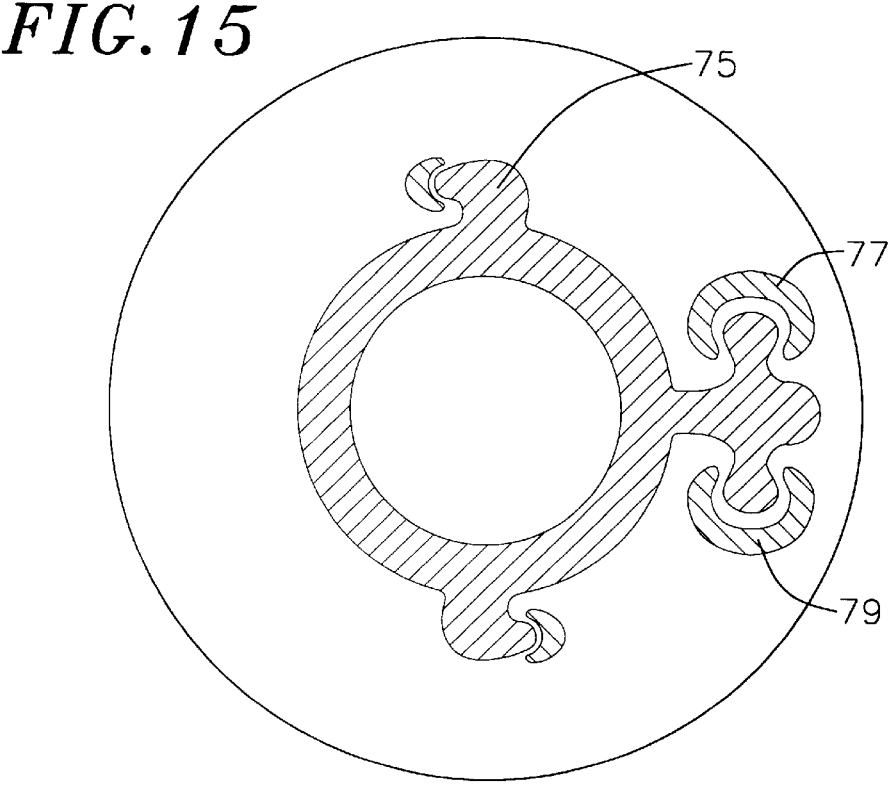
FIG. 15 illustrates a top view of another embodiment of electrical leads in the present invention.

FIGS. 14 and 15 illustrate top views of different embodiments of the leads in the present invention. In FIG. 14, a ground lead 71 acts as a common ground for the circuits closed by a contact pad (not shown) contacting the ground lead 71 and a specific lead 73. In FIG. 15, a ground lead 75 and first and second leads 77 and 79 are situated such that a single contact pad (not shown) contacts both the first and second leads 77 and 79 along with the ground lead 75 simultaneously. As a result, two circuits are closed.

Accordingly, the electrical leads of the present invention in all the embodiment of multiple input keys can be an array of wires or metal posts not coupled or embedded on a printed circuit board. Also, the electrical leads could be arranged in a multitude of ways provided that the leads are arranged to make electrical contact with a contact pad on a multiple input key.

Similarly, the electrical contact pads on the multiple input key can be arranged in a multitude of ways and the total number of electrical contact pads on a key can vary. Additionally, with more contact pads on a key, the more connections of the contact pads with associated leads are possible and thus the more potential interpretations by a microprocessor are also possible.

Table 4 summarizes the possible connections of a multiple input key with three contact pads and one potential interpretation by the microprocessor of the circuits closed.

TABLE 4

| Left Contact | Center Contact | Right Contact | Alphanumeric mode | Numeric mode |
|---|---|---|---|---|
| Open | Open | Open | None | None |
| Open | Open | Closed | C | 2 |
| Open | Closed | Open | 2 | 2 |
| Open | Closed | Closed | C | 2 |
| Closed | Open | Open | A | 2 |
| Closed | Open | Closed | Undefined | 2 |
| Closed | Closed | Open | A | 2 |
| Closed | Closed | Closed | B | 2 |

Table 5 summarizes the possible connections of a multiple input key with four contact pads and one potential interpretation by the microprocessor of the circuits closed.

TABLE 5

| Front Contact | Rear Contact | Left Contact | Right Contact | Text mode | Numeric mode |
|---|---|---|---|---|---|
| Open | Open | Open | Open | None | None |
| Open | Open | Open | Closed | B | 2 |
| Open | Open | Closed | Open | None | 2 |
| Open | Open | Closed | Closed | None | 2 |
| Open | Closed | Open | Open | C | 2 |
| Open | Closed | Open | Closed | None | 2 |
| Open | Closed | Closed | Open | None | 2 |
| Open | Closed | Closed | Closed | None | 2 |
| Closed | Open | Open | Open | A | 2 |
| Closed | Open | Open | Closed | None | 2 |
| Closed | Open | Closed | Open | None | 2 |
| Closed | Open | Closed | Closed | None | 2 |
| Closed | Closed | Open | Open | None | 2 |
| Closed | Closed | Open | Closed | None | 2 |
| Closed | Closed | Closed | Open | None | 2 |
| Closed | Closed | Closed | Closed | 2 | 2 |

In Tables 4–5, "Open" means that a contact pad is not connected to any of the leads and "Closed" means that a contact pad is connected to electrical leads.

Furthermore, the use of electrical contact pads and leads to create circuit closures in input devices in some cases is impractical due to space or operational constraints. In such cases, the input device is configured to contain pressure sensors. The pressure sensors would recognize and distinguish the movements of the multiple input keys. For instance, the pressure sensor recognizes the downward pressure of a key when the key is depressed. Similarly, the pressure sensors recognize the lateral movements of a key when the key is pivoted in the left or right direction or in all directions left, right, forward, or backward.

In another embodiment, the input device is configured to contain pressure sensors, electrical contact pads and associated leads. For example, a contact pad extends from the bottom surface of a multiple input key to create a circuit closure when the key is depressed and the contact pad contacts its associated leads. The pressure sensors situated around the multiple input key would recognize the lateral movements of a key when the key is pivoted.

Figure 16:
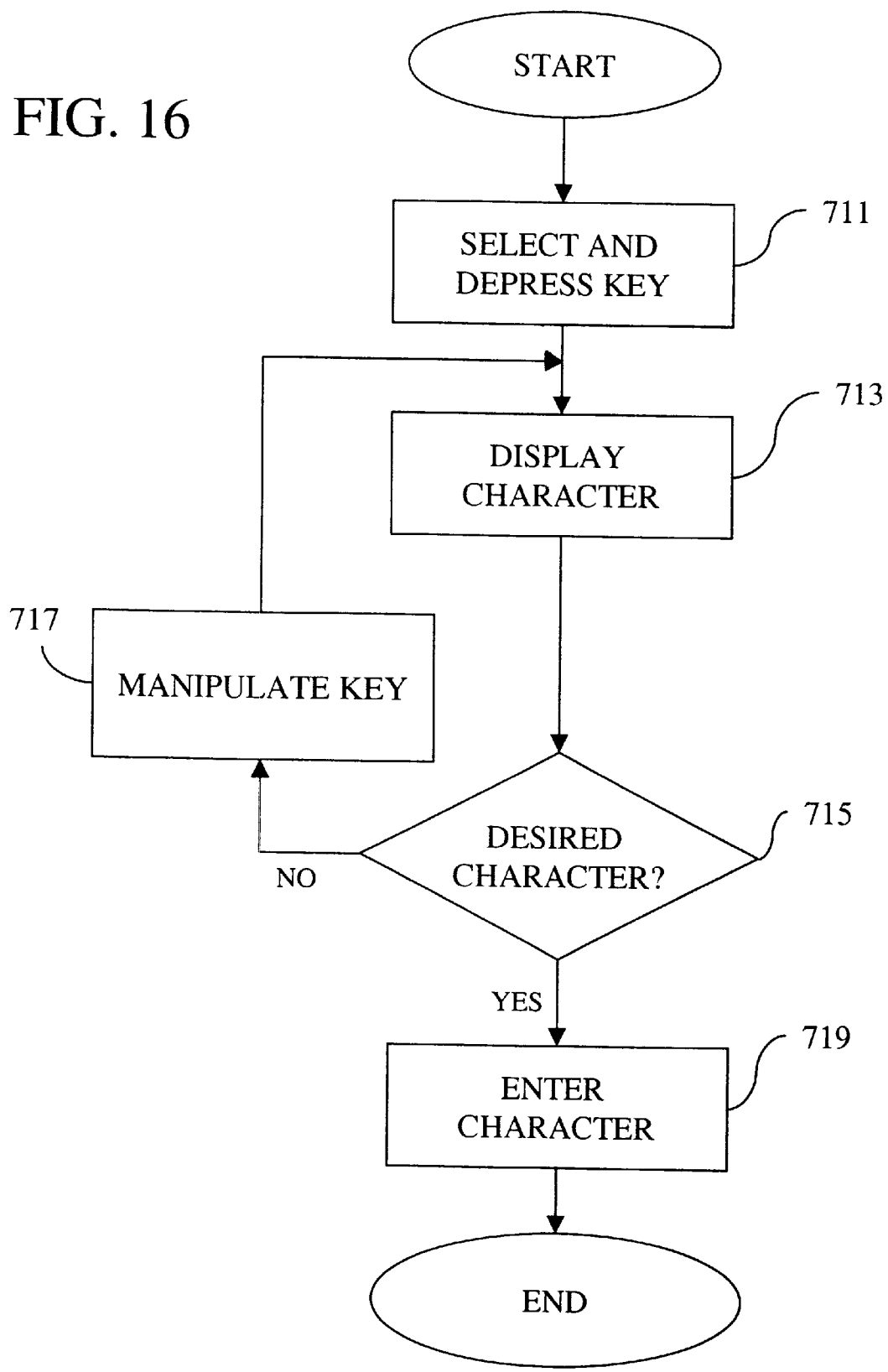
FIG. 16 illustrates a flow diagram of a process of inputting multiple characters using the multiple input device of the present invention.

FIG. 16 illustrates a flow diagram of a process of inputting multiple characters using the multiple input device shown in FIG. 1 having the embodiments of the multiple input keys shown in FIG. 8. A user selects one of the multiple input keys on the input device and exerts pressure upon the top surface of the input key such that the pivot with a contact pad contacts its associated leads on the printed circuit board of the input device (Step 711). A character is displayed on a display which is coupled with the input device and responsive to the input device (Step 713). The user determines if the character displayed is the desired character (Step 715). If the displayed character is not the desired character, the user pivots the multiple input key while still maintaining contact between the contact pad on the pivot with its leads (Step 717) and a different character is displayed (Step 713). The user continues to pivot the multiple input key until the desired character is displayed (Repeating steps 713, 715 and 717). Once the user has the desired character displayed, the user releases or removes the pressure upon the multiple input key, and as a result, entering the desired character into the input device (Step 719).

In an embodiment of the process in FIG. 16, step 717 is modified to include a step such that when the user exerts pressure on one edge of the top surface of the multiple key for an predetermined period of time, a number, symbol, or another letter is displayed. As the user releases the key, that character is entered.

In another embodiment of the process in FIG. 16, step 713 is modified such that when the user initially exerts pressure upon the key, only letters are displayed on the display or a full range of characters found on a keyboard is displayed. In another embodiment of the process in FIG. 16, steps 713 and 717 is also be modified such that a set of characters assigned to the key is displayed and one of characters is highlighted or pointed to by a cursor. In this case, the key being pivoted highlights a different character or the cursor moves to a different position adjacent to the character.

Figure 17:
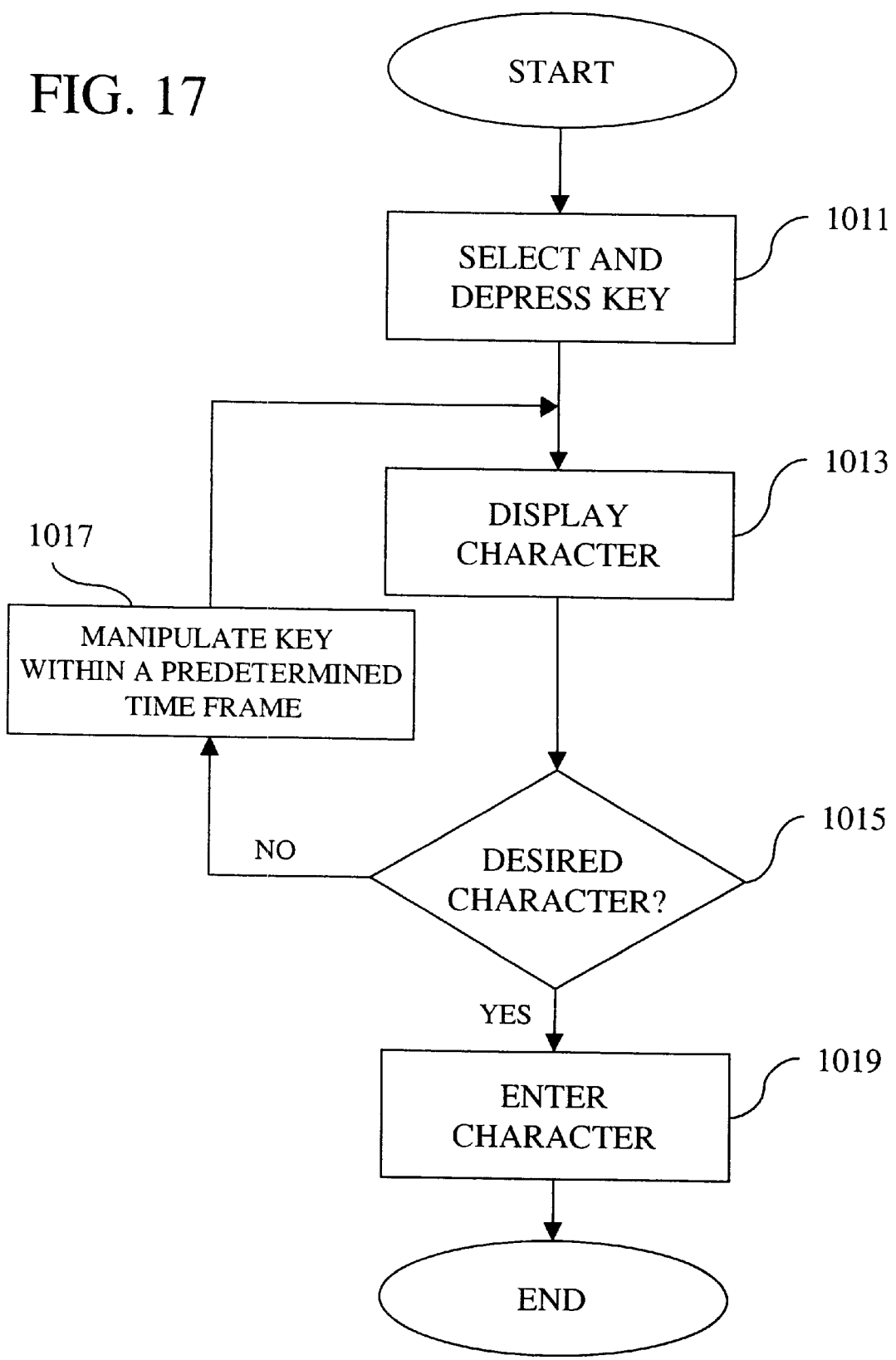
FIG. 17 illustrates a flow diagram of another embodiment of a process of inputting multiple characters using the multiple input device of the present invention.

FIG. 17 illustrates a flow diagram of a process of inputting multiple characters using the multiple input device shown in FIG. 1 having the embodiments of the multiple input keys shown in FIGS. 2–7. A user selects one of the multiple input keys on the input device and exerts pressure upon the top surface of the input key such that one of the contact pads contacts its associated leads on the printed circuit board (Step 1011). A character is displayed on a display which is coupled with the input device and responsive to the input device (Step 1013). The user determines if the character displayed is the desired character (Step 1015). If the displayed character is not the desired character, the user pivots the multiple input key such that a contact pad contacts its associated leads within a predetermined time frame (Step 1017). The display responsive to the key being pivoted displays a different character (Step 1013). The user continues to pivot the multiple input key until the desired character is indicated (Repeating steps 1013, 1015 and 1017). Once the user has indicated the desired character the user releases or removes the pressure upon the multiple input key for an predetermined period of time or depresses another multiple input key and as a result, the desired character is inputted (Step 1019).

In an embodiment of the process in FIG. 17, step 1013 is modified such that when the user initially exerts pressure upon the key, only letters or a full range of characters found on a keyboard is displayed. In another embodiment of the process in FIG. 17, step 1013 and step 1017 is modified such that when the user exerts pressure on one edge of the top surface of the multiple key for an extended period of time, a specific number, symbol, or letter is displayed.

In another embodiment of the process in FIG. 17, steps 1013 and 1017 is also be modified such that a set of characters assigned to the key is displayed and one of characters is highlighted or pointed to by a cursor. In this case, the key being pivoted within a predetermined time frame causes a different character to be highlighted or the cursor to be moved to a different position adjacent to a different character.

Accordingly, the present invention provides devices and methods for inputting multiple characters through the use of a multiple input key. Although this invention has been described in certain specific embodiments, many additional modifications and variations would be apparent to those skilled in the art. It is therefore to be understood that this invention may be practiced otherwise than as specifically described. Thus, the present embodiment of the invention should be considered in all respects as illustrative and not restrictive, the scope of the invention to be determined by the appended claims and their equivalents rather than the foregoing description.

What is claimed is:

1. A method of selecting multiple characters to be inputted for an electronic device using a multiple input device coupled with a display, the method comprising the steps of:

detecting the depression of a key on a multiple input device that causes an electrical contact pad on a pivot of the key to contact a first one of a plurality of electrical leads on a printed circuit board;

simultaneously displaying a choice of characters on a display upon the detection of the depression of the key where the key, corresponds to the choice of characters;

recognizing the pivoting of the key in which one of a plurality of electrical contact pads on a body of the key contacts a second one of a plurality of electrical leads on a printed circuit board and the electrical contact pad on the pivot maintains contact with the first one of the plurality of electrical leads; and distinguishing on the display a character from the choice of characters displayed along with the choice of characters displayed and in response to recognizing the pivoting of the key.

2. The method in claim 1 further comprising activating a separate key and switching between alphanumeric and numeric only modes in response to the separate key being activated.

3. The method in claim 1 further comprising responding to circuits closed by one of a plurality of electrical contact pads on a body of the key contacting a second one of a plurality of electrical leads on a printed circuit board and forming a code based on the circuits closed.

4. The method in claim 1 further comprising:

detecting the electrical contact pad on the pivot of the key breaking contact with the first one of the plurality of electrical leads in the multiple input device such that the character distinguished is inputted;

comparing the character inputted to a plurality of words by using a processor programmed with an electronic dictionary; and displaying one word from the plurality of words in which the one word has a portion that corresponds to the character inputted.

5. The method in claim 1 further comprising:

pre-determining characters to be expected prior to displaying a choice of characters on the display;

identifying context of input of characters based on characters pre-determined; and switching between alphanumeric and numeric only modes in response to the context identified by using a processor configured to automatically switch between alphanumeric and numeric only modes.

6. The method in claim 1 further comprising displaying a specific character on the display upon the detection of the depression of the key for a period of time in which the specific character displayed replaces the choice of characters displayed.

7. The method in claim 1 further comprising detecting the electrical contact pad on the pivot of the key breaking contact with the first one of the plurality of electrical leads in the multiple input device prior to recognizing the pivoting of the key, such that when the electrical contact pad on the pivot of the key breaks contact with the first one of the plurality of electrical leads for a predetermined period of time, a character from the choice of characters displayed is inputted.

8. The method in claim 1 further comprising detecting the electrical contact pad on the pivot of the key breaking contact with the first one of the plurality of electrical leads in the multiple input device prior to recognizing the pivoting of the key, such that a character from the choice of characters displayed is inputted.

9. The method in claim 8 further comprising detecting the electrical contact pad on the pivot of the key breaking contact with the first one of the plurality of electrical leads in the multiple input device, such that the character distinguished which corresponds to the second one of the plurality of electrical leads is inputted.

10. The method in claim 1 wherein indicating a character from the choice of characters displayed further includes highlighting a character of the choice of characters on the display upon the recognition of the pivoting of the key in which one of the plurality of electrical contact pads on the body of the key contacts the second one of the plurality of electrical leads while the electrical contact pad on the pivot maintains contact with the first one of the plurality of electrical leads, where the highlighted character corresponds with the second one of the plurality of electrical leads.

11. The method in claim 10 further comprising detecting the electrical contact pad on the pivot of the key breaking contact with the first one of the plurality of electrical leads.

12. The method in claim 11 further comprising inputting the character highlighted upon detecting the electrical contact pad on the pivot of the key breaking contact with the first one of the plurality of electrical leads.

13. A method of selecting multiple characters to be inputted for an electronic device using a multiple input device coupled with a display, the method comprising the steps of:

detecting the depression of a key on a multiple input device that causes an electrical contact pad on a pivot of the key to contact a first one of a plurality of electrical leads on a printed circuit board;

displaying on a display a first character when the key depression is detected recognizing the pivoting of the key in which one of a plurality of electrical contact pads on a body of the key contacts a second one of a plurality of electrical leads on a printed circuit board and the electrical contact pad on the pivot maintains contact with the first one of the plurality of electrical leads; and displaying a second character on the display to replace the first character displayed in response to recognizing the pivoting of the key.

14. The method in claim 13 further comprising detecting the electrical contact pad on the pivot of the key breaking contact with the first one of the plurality of electrical leads before the second character is displayed.

15. The method in claim 14 further comprising inputting the first character corresponding to the first one of the plurality of electrical leads upon detecting the electrical contact pad on the pivot of the key breaking contact with the first one of the plurality of electrical leads.

16. The method in claim 13 further comprising displaying a third character on the display upon the recognition of the pivoting of the key in which one of the plurality of electrical contact pads on the body of the key contacts a second one of the plurality of electrical leads on the printed circuit board while the electrical contact pad on the pivot maintains contact with the first one of the plurality of electrical leads for a predetermined period of time.

17. The method in claim 16 further comprising detecting the electrical contact pad on the pivot of the key breaking contact with the first one of the plurality of electrical leads after the second character is displayed and before the third character is displayed.

18. The method in claim 17 further comprising inputting the second character corresponding to the second one of the plurality of electrical leads upon detecting the electrical contact pad on the pivot of the key breaking contact with the first one of the plurality of electrical leads.

* * * * *